(12) United States Patent
Zhou et al.

(10) Patent No.: US 11,741,342 B2
(45) Date of Patent: Aug. 29, 2023

(54) RESOURCE-EFFICIENT NEURAL ARCHITECTS

(71) Applicant: Baidu USA, LLC, Sunnyvale, CA (US)

(72) Inventors: Yanqi Zhou, San Jose, CA (US);
Siavash Ebrahimi, San Jose, CA (US);
Sercan Arik, San Francisco, CA (US);
Haonan Yu, San Jose, CA (US);
Hairong Liu, San Jose, CA (US);
Gregory Diamos, San Jose, CA (US)

(73) Assignee: Baidu USA LLC, Sunnyvale, CA (US)

( * ) Notice: Subject to any disclaimer, the term of this patent is extended or adjusted under 35 U.S.C. 154(b) by 1119 days.

(21) Appl. No.: 16/297,412

(22) Filed: Mar. 8, 2019

(65) Prior Publication Data
US 2019/0354837 A1    Nov. 21, 2019

Related U.S. Application Data

(60) Provisional application No. 62/673,309, filed on May 18, 2018.

(51) Int. Cl.
*G06N 3/044*    (2023.01)
*G06N 3/08*    (2023.01)

(52) U.S. Cl.
CPC .............. *G06N 3/044* (2023.01); *G06N 3/08* (2013.01)

(58) Field of Classification Search
CPC ............................. G06N 3/08; G06N 3/0445
See application file for complete search history.

(56) References Cited

U.S. PATENT DOCUMENTS

2018/0189673 A1* 7/2018 Dalton .................. G06N 3/08
2018/0336453 A1* 11/2018 Merity ................ G06N 3/0445

OTHER PUBLICATIONS

Shirakawa et al. (Dynamic Optimization of Neural Network Structures Using Probabilistic Modeling, Jan. 2018, pp. 1-9) (Year: 2018).*

(Continued)

*Primary Examiner* — George Giroux
(74) *Attorney, Agent, or Firm* — North Weber & Baugh LLP

(57) ABSTRACT

Neural Architecture Search (NAS) is a laborious process. Prior work on automated NAS targets mainly on improving accuracy but lacked consideration of computational resource use. Presented herein are embodiments of a Resource-Efficient Neural Architect (RENA), an efficient resource-constrained NAS using reinforcement learning with network embedding. RENA embodiments use a policy network to process the network embeddings to generate new configurations. Example demonstrates of RENA embodiments on image recognition and keyword spotting (KWS) problems are also presented herein. RENA embodiments can find novel architectures that achieve high performance even with tight resource constraints. For the CIFAR10 dataset, the tested embodiment achieved 2.95% test error when compute intensity is greater than 100 FLOPs/byte, and 3.87% test error when model size was less than 3M parameters. For the Google Speech Commands Dataset, the tested RENA embodiment achieved the state-of-the-art accuracy without resource constraints, and it outperformed the optimized architectures with tight resource constraints.

20 Claims, 15 Drawing Sheets

(56) References Cited

OTHER PUBLICATIONS

Zoph et al. (Learning Transferable Architectures for Scalable Image Recognition, Apr. 2018, pp. 1-14) (Year: 2018).*
Jozefowicz et al. (An Empirical Exploration of Recurrent Network Architectures, 2015, pp. 1-9) (Year: 2015).*
Amodei et al.,"Deep Speech 2: End-to-End Speech Recognition in English and Mandarin," arXiv preprint arXiv:1512.02595, 2015. (28pgs).
Ashok et al.,"N2N learning: Network to network compression via policy gradient reinforcement learning," arXiv preprint arXiv:1709.0603, 2017. (20pgs).
Baker et al.,"Accelerating Neural Architecture Search using Performance Prediction," arXiv preprint arXiv:1705.10823, 2017. (14pgs).
Baker et al.,"Designing Neural Network Architectures using Reinforcement Learning," arXiv preprint arXiv:1611.02167, 2017. (18pgs).
Bergstra et al.,"Random search for hyper-parameter optimization," Journal of Machine Learning Research 13 (2012) 281-305, 2012. (25pgs).
F. Chollet "Xception: Deep Learning with Depthwise Separable Convolutions," arXiv preprint arXiv:1610.02357, 2017. (8pgs).
Han et al.,"Learning both weights and connections for efficient neural networks," arXiv preprint arXiv: 1506.02626, 2015. (9pgs).
Hinton et al.,"Distilling the Knowledge in a Neural Network," arXiv preprint arXiv:1503.02531, 2015. (9pgs).
Howard et al.,"MobileNets: Efficient Convolutional Neural Networks for Mobile VisionApplications," arXiv preprint arXiv:1704.04861, 2017. (9pgs).
Hubara et al.,"Quantized Neural Networks: Training Neural Networks withLow Precision Weights and Activations," arXiv preprint arXiv:1609.07061, 2016. (29 pgs).
Jouppi et al.,"In-Datacenter performance analysis of a tensor processing unit," arXiv preprint arXiv:1704.04760, 2017. (17pgs).
Kandasamy et al.,"Neural architecture search with bayesian optimisation and optimal transport," arXiv preprint arXiv:1802.07191, 2018. (32 pgs).
Karras et al.,"Progressive Growing of GANs for Improved Quality, Stability, and Variation," arXiv preprint arXiv:1710.10196, 2018. (26pgs).
Liu et al.,"Sparse convolutional neural networks," In 2015 IEEE Conference on Computer Vision and Pattern Recognition (CVPR), pp. 806-814, 2015.(9pgs).
Liu et al.,"Progressive Neural Architecture Search," arXiv preprint arXiv:1712.00559, 2018. (20pgs).
Liu et al.,"Hierarchical representations for efficient architecture search," arXiv preprint arXiv:1711.00436, 2018. (13pgs).
Loshchilov et al.,"SGDR: stochastic gradient descent with restarts," arXiv preprint arXiv:1608.03983, 2017. (16pgs).
Negrinho et al.,"DeepArchitect: Automatically Designing and Training Deep Architectures," arXiv preprint arXiv:1 704.08792, 2017. (12pgs).
Pham et al.,"Efficient Neural Architecture Search via Parameter Sharing," arXiv preprint arXiv:1802.03268, 2018. (11 pgs).
Real et al.,"Large-scale evolution of image classifiers," arXiv preprint arXiv:1703.01041, 2017. (18pgs).
Real et al.,"Regularized evolution for image classifier architecture search," arXiv preprint arXiv:1802.01548, 2019. (16pgs).
R.J. Williams "Simple statistical gradient-following algorithms for connectionist reinforcement learning," Machine Learning, 8, pp. 229-256, 1992. (27pgs).
Sandler et al.,"MobileNetV2: Inverted Residuals and Linear Bottlenecks," arXiv preprint arXiv:1801.04381, 2018. (14pgs).
Simonyan et al.,"Very Deep Convolutional Networks for Large-Scale Image Recognition," arXiv preprint arXiv:1409.1556, 2015. (14pgs).
Sindhwani et al.,"Structured Transforms for Small-Footprint Deep Learning," arXiv preprint arXiv:1510.01722, 2015. (9 pgs).
Szegedy et al.,"Rethinking the inception architecture for computer vision," arXiv preprint arXiv:1512.00567, 2015. (10pgs).
Elsken et al.,"Efficient Multi-objective Neural Architecture Searchvia Lamarckian Evolution," arXiv preprint arXiv:1804.09081, 2019. (23pgs).
Van den Oord et al.,"Parallel WaveNet: Fast High-Fidelity Speech Synthesis," arXiv preprint arXiv:1711.10433, 2017. (11pgs).
P. Warden, "Speech Commands: A Dataset for Limited-Vocabulary Speech Recognition," arXiv preprint arXiv: 1804.03209, 2018. (11 pgs).
Wu et al.,"Google's Neural Machine Translation System: Bridging the Gap between Human and Machine Translation," arXiv preprint arXiv:1609.08144, 2016. (23pgs).
Xu et al.,"Show, Attend and Tell: Neural Image Caption Generation with Visual Attention," arXiv preprint arXiv:1502.03044, 2016. (22 pgs).
Zhang et al.,"Hello Edge: Keyword Spotting on Microcontrollers," arXiv preprint arXiv:1711.07128, 2018. (14pgs).
Zoph et al.,"Neural Architecture Search with Reinforcement Learning," arXiv preprint arXiv:1611.01578, 2017. (16pgs).
Zhou et al.,"Neural Architect: A Multi-objective Neural Architecture Search with Performance Prediction," [online], [Retrieved Jul. 21, 2020]. Retrieved from Internet <URL: 2018 (3pgs) <URL: https: //mlsys. org/Conferences/doc/2018/94.pdf>.

* cited by examiner

600

Map an LSTM state output to a probability mass function (p.m.f.) to sample features of a new layer to be generated — 605

FIG. 6

RESOURCE-EFFICIENT NEURAL ARCHITECTS

CROSS-REFERENCE TO RELATED APPLICATION

This application claims the priority benefit under 35 USC § 119(e) to U.S. Prov. Pat. App. Ser. No. 62/673,309, filed on 18 May 2018, entitled "RESOURCE-EFFICIENT NEURAL ARCHITECT," and listing Yanqi Zhou, Siavash Ebrahimi, Sercan Arik, Haonan Yu, and Hairong Liu, as inventors. The aforementioned patent document is incorporated by reference herein in its entirety and for all purposes.

BACKGROUND

A. Technical Field

The present disclosure relates generally to systems and methods for computer learning that can provide improved computer performance, features, and uses. More particularly, the present disclosure relates to embodiments for an efficient resource-constrained neural architecture search (NAS).

B. Background

Deep neural networks have demonstrated excellent performance on challenging research benchmarks, while pushing the frontiers of numerous impactful applications such as language translation, speech recognition, speech synthesis, image recognition, and image synthesis. Despite all these advancements, designing neural networks still remains a laborious task, requiring extensive experience and expertise. With the motivation of automating the neural network development process while achieving competitive performance, neural architecture search (NAS) has been proposed. For some competitive benchmarks like image recognition, NAS has yielded very promising results compared to manually designed models.

Historical trend in artificial intelligence research has been improving the performance of a model on a certain task, without considering resource use metrics, such as model memory, complexity, and power consumption. Larger and deeper neural networks with specially-designed architectures have been developed along this trend. On the other hand, as deep neural networks are starting to be deployed in different applications more widely, resource constraints become crucial besides performance.

Accordingly, what is needed are embodiments that can automate the process of finding high-performance neural network architectures under different resource constraints with a reasonable amount of search.

BRIEF DESCRIPTION OF THE DRAWINGS

References will be made to embodiments of the disclosure, examples of which may be illustrated in the accompanying figures. These figures are intended to be illustrative, not limiting. Although the disclosure is generally described in the context of these embodiments, it should be understood that it is not intended to limit the scope of the disclosure to these particular embodiments. Items in the figures may not be to scale.

Figure ("FIG.") 1 shows a high-level depiction of a neural architect, according to embodiments of the present disclosure.

FIG. 6 depicts a methodology to facilitate architecture configuration exploration using probability mass functions, according to embodiments of the present disclosure.

DETAILED DESCRIPTION OF EMBODIMENTS

Figure 1:
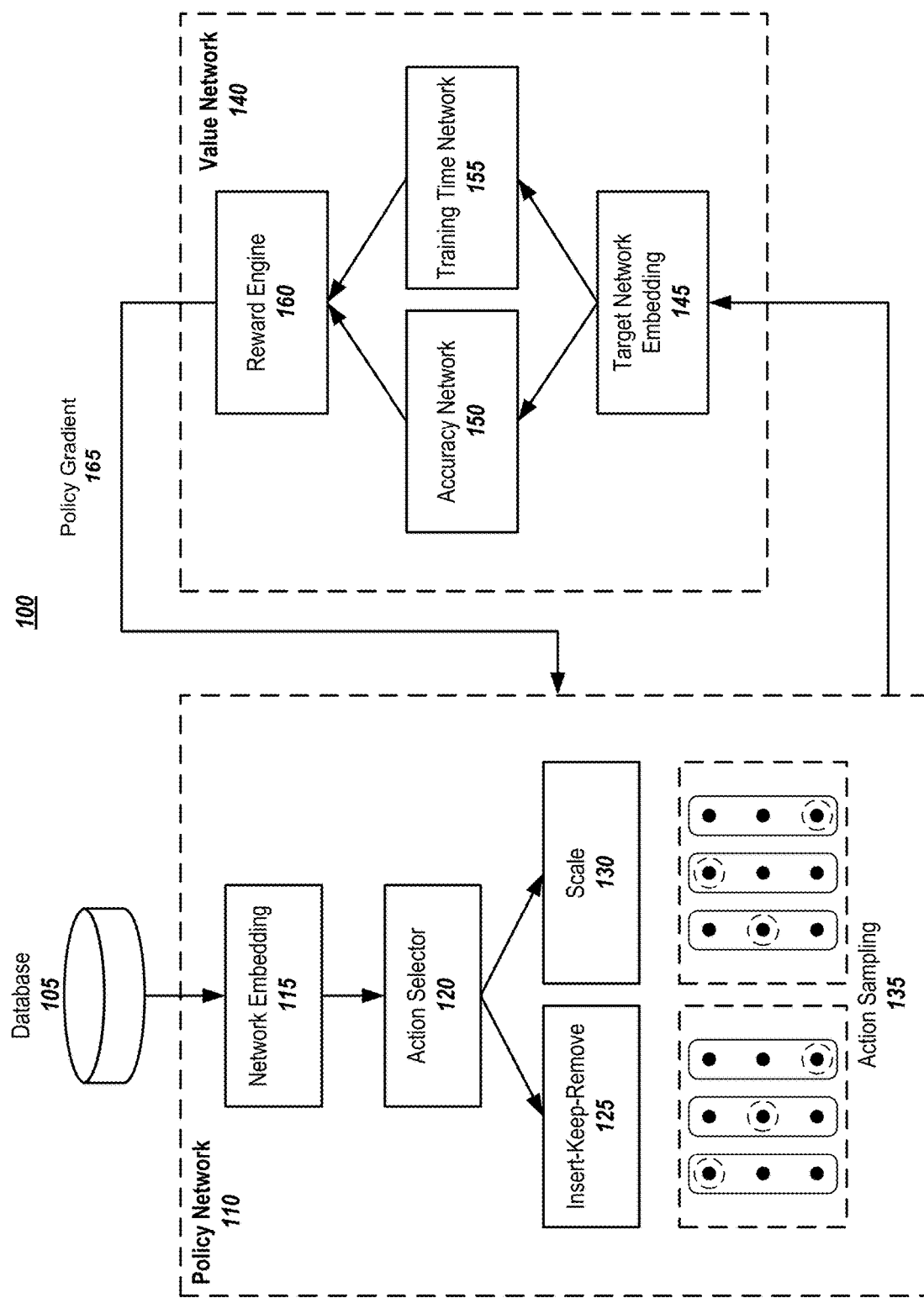

In the following description, for purposes of explanation, specific details are set forth in order to provide an understanding of the disclosure. It will be apparent, however, to one skilled in the art that the disclosure can be practiced without these details. Furthermore, one skilled in the art will recognize that embodiments of the present disclosure, described below, may be implemented in a variety of ways, such as a process, an apparatus, a system, a device, or a method on a tangible computer-readable medium.

Components, or modules, shown in diagrams are illustrative of exemplary embodiments of the disclosure and are meant to avoid obscuring the disclosure. It shall also be understood that throughout this discussion that components may be described as separate functional units, which may comprise sub-units, but those skilled in the art will recognize that various components, or portions thereof, may be divided into separate components or may be integrated together, including integrated within a single system or component. It should be noted that functions or operations discussed herein may be implemented as components. Components may be implemented in software, hardware, or a combination thereof.

Furthermore, connections between components or systems within the figures are not intended to be limited to direct connections. Rather, data between these components may be modified, re-formatted, or otherwise changed by intermediary components. Also, additional or fewer connections may be used. It shall also be noted that the terms "coupled," "connected," or "communicatively coupled" shall be understood to include direct connections, indirect connections through one or more intermediary devices, and wireless connections.

Reference in the specification to "one embodiment," "preferred embodiment," "an embodiment," or "embodiments" means that a particular feature, structure, characteristic, or function described in connection with the embodiment is included in at least one embodiment of the disclosure and may be in more than one embodiment. Also, the appearances of the above-noted phrases in various places in the specification are not necessarily all referring to the same embodiment or embodiments.

The use of certain terms in various places in the specification is for illustration and should not be construed as limiting. A service, function, or resource is not limited to a single service, function, or resource; usage of these terms may refer to a grouping of related services, functions, or resources, which may be distributed or aggregated.

The terms "include," "including," "comprise," and "comprising" shall be understood to be open terms and any lists the follow are examples and not meant to be limited to the listed items. Any headings used herein are for organizational purposes only and shall not be used to limit the scope of the description or the claims. Each reference mentioned in this patent document is incorporate by reference herein in its entirety.

Furthermore, one skilled in the art shall recognize that: (1) certain steps may optionally be performed; (2) steps may not be limited to the specific order set forth herein; (3) certain steps may be performed in different orders; and (4) certain steps may be done concurrently.

It shall be noted that any experiments and results provided herein are provided by way of illustration and were performed under specific conditions using a specific embodiment or embodiments; accordingly, neither these experiments nor their results shall be used to limit the scope of the disclosure of the current patent document.

A. Introduction

As noted above, historically artificial intelligence research has been improving the performance of a model on a certain task, without considering resource use metrics, such as model memory, complexity, and power consumption. However, as deep neural networks are starting to be deployed in different applications, resource constraints are becoming more important considerations in model designs besides just performance. Specifically, resource-constrained neural network development is motivated by at least two recent trends:

(i) There is a growing interest in optimizing the performance of modern processors for deep neural networks. These specialized architectures typically yield their peak performance for algorithms with high compute intensity. Yet, it has been an uncommon research practice to develop neural network architectures that would yield high compute intensities.

(ii) Besides conventional computing platforms like datacenters or personal computers, deep neural networks are being deployed on a wide variety of hardware platforms, such as smartphones, drones, autonomous vehicles, and smart speakers, etc. Such platforms may vary hugely in terms of their computation capabilities, memory capacities or power budgets, as well as the performance targets. Thus, a neural network needs to be re-optimized for every hardware platform it will be deployed on.

Resource constraints exacerbate the challenges of neural network model development, and it is strongly desired to automate this process along the two trends mentioned above. In this patent document, embodiments of a resource-constrained NAS framework, which may be generally referred to as Resource-Efficient Neural Architect (RENA), are presented. A goal is to automate the process of finding high-performance neural network architectures under different resource constraints with a reasonable amount of search. Some of the major contributions provided by RENA embodiments comprise:

1. A policy network with network embedding is designed to adapt existing models progressively, rather than building from scratch.

2. A framework for modifying the reward function to tailor target models to meet hardware constraints and three simple metrics (model size, compute complexity, and compute intensity) that are interpretable to hardware designers and can be used to guide the search are introduced herein.

3. Competitive performance for two tasks: (i) image recognition, and (ii) keyword spotting (KWS), even with tight resource constraints, is demonstrated.

B. Related Work

1. Neural Architecture Search

Automatic neural architecture search (NAS) has been a long-standing research area. Evolutionary algorithms are one of the earliest methods used for automatic NAS. NAS has also been studied in the context of Bayesian optimization. Recently, reinforcement learning has emerged as an effective method for automatic NAS. However, conventional NAS is computationally expensive and time consuming—many results are obtained with a vast amount of computational resources. This renders NAS less realistic for widespread use in research. To address this, efficient automatic NAS with parameter sharing, regularized search, and network morphism are becoming a critical research area. Parameter sharing forces all child models to share weights to eschew training each child model from scratch to convergence.

2. Resource-Constrained Neural Networks

Most of the effective approaches to optimize performance under resource constraints still rely on the creativity of the researchers. Among many, some notable ones include attention mechanisms, depthwise-separable convolutions, inverted residuals, and structured transforms. Aside from the approaches that optimize the neural network architecture that change the type of the layers, common approaches to reduce redundancy indeed use techniques that do not modify the form of the network architecture. These include sparsity regularization, connection pruning, and reducing the precision of weights and activations.

Lastly, training a smaller (student) network to mimic a larger (teacher) network, commonly known as distillation, has gained traction. For example, in one instance, distillation was applied to learning an inverse-autoregressive flow model.

C. General Overview

FIG. 1 shows a high-level depiction 100 of a resource-efficient neural architect (RENA), according to embodiments of the present disclosure. As shown in FIG. 1, in one or more embodiments, a RENA embodiment may comprise two principal networks: a policy network 110 and a value network (or a performance simulation network) 140. In one or more embodiments, the policy network 110, that is communicatively coupled to a database 105 comprising network configuration information, takes network configuration information of a current network and converts it to network embedding 115 and generates, via an action selector 120, network transformation actions, such as "insert" (insert a layer) 125 or "scale" (scale a layer) 130. To allow for variance, features may be sampled 135.

In one or more embodiments, a value network 140 takes in network embedding of the generated target network 145 and data distributions to approximate the reward by ascertain metrics, such as network accuracy 150 and training time 155—although other metrics may also be determined. In one or more embodiments, the value network may predict target network accuracy and training time without actually running the target network till convergence. In one or more embodiments, both the accuracy network 150 and the training time network 155 are trainable neural networks that may be pre-trained or trained jointly with the policy network.

In one or more embodiments, the final reward engine 160 sets weights to various metrics, such as network accuracy, model size, and training time, which may be set according to user specification. The configurable reward engine 160 enables finding neural architectures with various resource constraints, such as memory size and GPU time. In one or more embodiments, a policy gradient 165 is applied to train the policy network.

Figure 2:
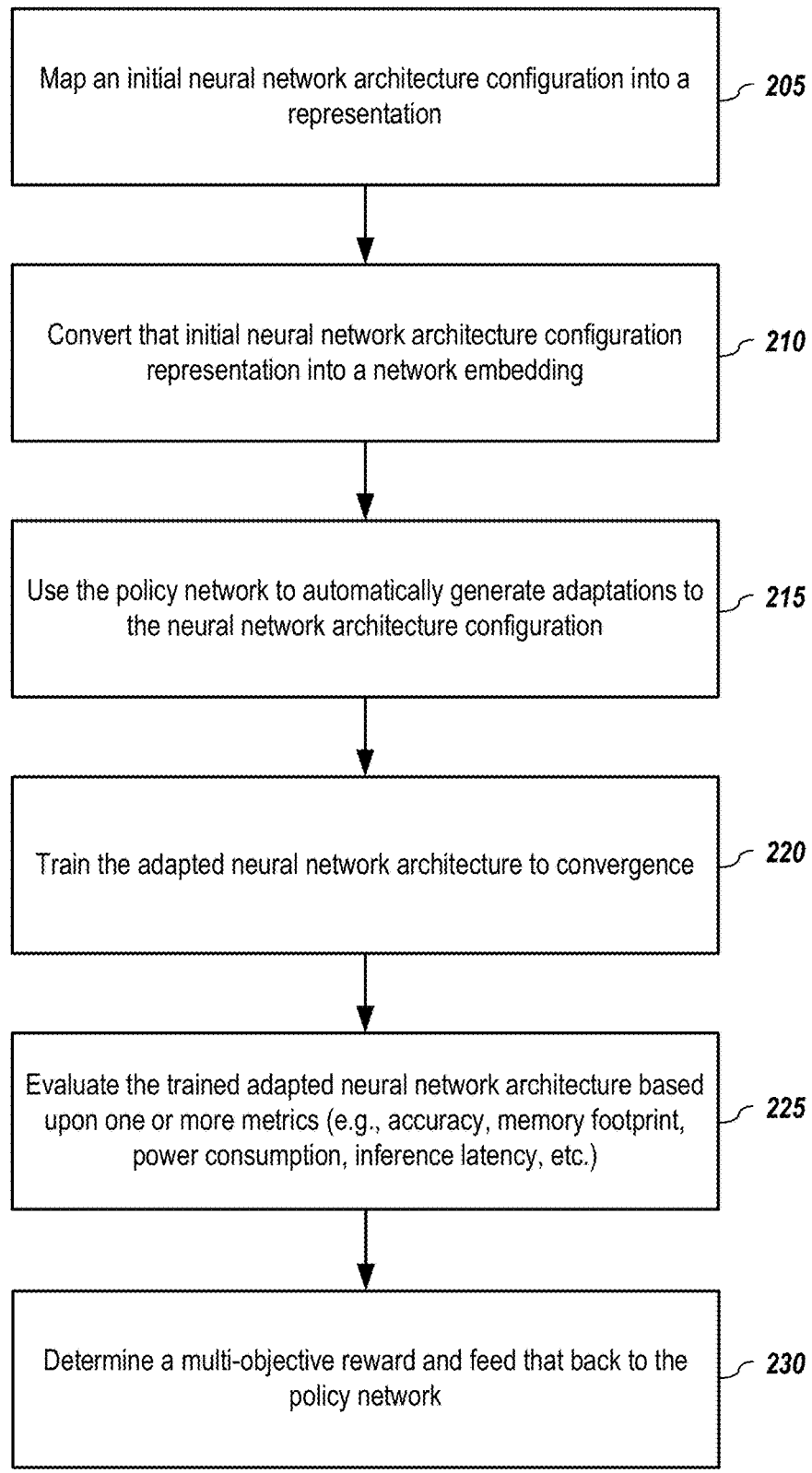
FIG. 2 depicts a general methodology that may be employed by a neural architect framework, according to embodiments of the present disclosure.

FIG. 2 depicts a general methodology that may be employed by a RENA framework embodiment, according to embodiments of the present disclosure. In one or more embodiments, an initial neural network architecture configuration is mapped (205) into a representation, such as using a lookup table. In one or more embodiments, a policy network converts (210) that initial neural network architecture configuration representation into a network embedding. Then, in embodiments, the policy network uses (215) that network embedding to automatically generate adaptations to the neural network architecture configuration. In one or more embodiments, the adapted neural network is trained (220) to convergence, and the trained adapted neural network architecture may be evaluated (225) based upon one or more metrics (e.g., accuracy, memory footprint, power consumption, inference latency, etc.). In one or more embodiments, a policy gradient method may be used (230) to compute a multi-objective reward that is feed back to the policy network to improve the policy network's ability to automatically generate a set of one or more best architectures. In one or more embodiments, a number of adapted neural network architectures may be processed in parallel per episode as part of the reinforcement step.

Additional details and alternative RENA embodiments and methodologies are presented herein.

D. Modeling Resource Use

Modeling the hardware performance of an algorithm is undoubtedly a challenging task. A goal in this patent document is not to model the performance in the most precise way, but rather to show that when approximate metrics are considered, RENA embodiments can efficiently optimize them. For example, for embedded devices, inference latency and power consumption are two important metrics when deploying neural networks. Yet, accurate modeling of them are very challenging—typical approaches depend on various assumptions about the hardware platforms. Instead, embodiments herein focus on inference metrics that can be precisely quantified in terms of the fundamental operations, and that can also provide interpretable insights. The three metrics that were considered are:

(i) Model size: Model size may be quantified by the total amount of memory used by the model parameters. For a given neural network, model size depends on the dimensions of the weight tensors, and the precision of each tensor. In one or more embodiments, the precision of weights were fixed to four (4) bytes and focus was on the tensor sizes. Straightforward approaches to reduce the model size may involve reducing the input resolution (e.g., decreasing the number of frequency channels in spectral representation), removing layers, reducing the number of hidden units (e.g., for recurrent cells), or reducing the number of filters (e.g., for convolutions). For a target performance, reduction of model size encourages architectures with more parameter sharing (e.g. depthwise-separable convolutions with short filter sizes) and repetitive computations (e.g., recurrent layers with long sequence lengths and small number of hidden units).

(ii) Computational complexity: Computational complexity may be quantified by the total number of floating-point operations (FLOPs) (see Appendix A for details). Straightforward approaches to reduce the inference complexity are mostly similar to the approaches to reduce the model size, such as reducing the number of hidden units or the number of filters. In general, reduction of complexity encourages models with minimal redundancy (e.g., by joining concatenated linear operations).

(iii) Compute intensity: Compute intensity may be defined as the average number of FLOPs per data access (i.e. data transfer between the fast and slow memory) (but compute intensity may also be modeled as the compute intensity per weight access, ignoring input and output data). Compute intensity may be considered as a measure of how efficiently an algorithm can re-use data. For modern multi-core architectures like graphic processing units (GPUs) and tensor processing units (TPUs), it is an indirect measure of how fast the algorithm can be run. In general, if a neural network reuses data, it requires less memory bandwidth and achieves higher compute intensity. High compute intensity encourages neural networks with more locality and often more parallelism. As a simple example, consider matrix-matrix multiplication of an m×n matrix and an n×p matrix. The compute intensity would be proportional to $$\frac{mnp}{mn+np} = \frac{1}{\frac{1}{p}+\frac{1}{m}}.$$

Increasing it would favor for increases in p and m. If there is a constraint on their sum, due to the total model size or overfitting considerations, higher compute intensity would favor for p and m values close to each other. One example of a very high compute intensity neural network layer is multi-dimensional convolution with appropriately large channel sizes. On the other hand, recurrent layers used in typical language or speech processing applications, or some recently-popular techniques like multi-branch networks, yield low compute intensity.

E. Embodiments of Architecture Search with Reinforcement Learning

In this section, embodiments of the overall reinforcement learning (RL) framework of RENA and the corresponding search space are explained. In one or more embodiments, the framework comprises a policy network to generate an action or actions that define the neural network architecture. In one or more embodiments, the environment outputs the performance of the trained neural network, as well as its resource use. In one or more embodiments, a policy gradient with accumulated rewards was used to train the policy network.

1. Policy Network

Figure 3:
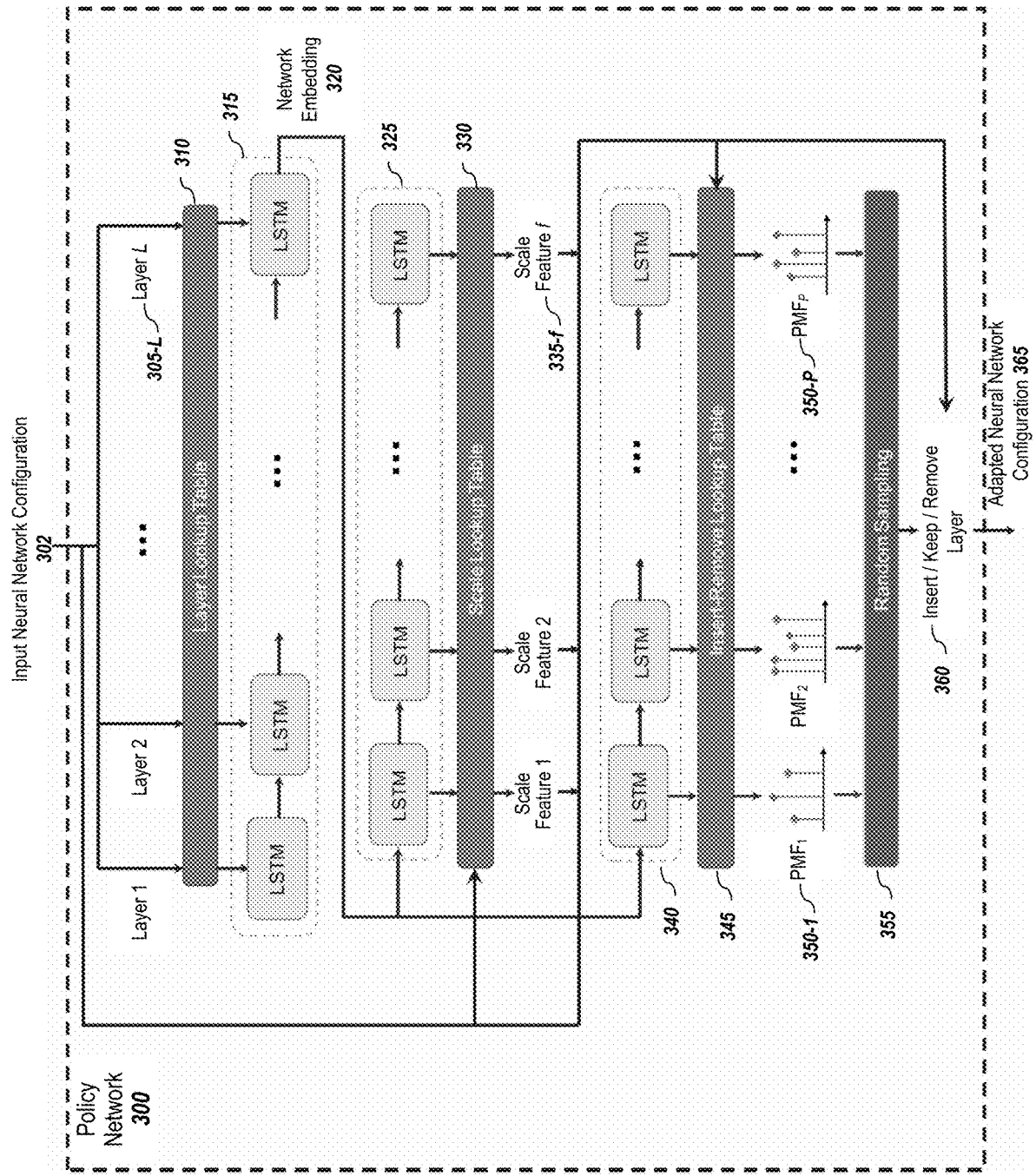
FIG. 3 depicts a policy network with network embedding, in which a long short-term memory (LSTM)-based network transforms an existing neural network configuration into a trainable representation and the trainable representation is fed to a LSTM-based policy network to generate actions, according to embodiments of the present disclosure.

FIG. 3 depicts a policy network 300 with network embedding, in which a long short-term memory (LSTM)-based network transforms an existing neural network configuration into a trainable representation and the trainable representation is fed to a LSTM-based policy network to generate actions, according to embodiments of the present disclosure. An embodiment of a policy network 300, shown in FIG. 3, adapts an existing network configuration by modifying its parameters (which may be referred to as the scale action), or by inserting a new layer (which may be referred to as the insert action), or by removing an existing layer (which may be referred to as the remove action). Rather than building the target network from scratch, modifications via these operations allow more sample-efficient search with a simpler architecture. In one or more embodiments, a search can start with any baseline models, a well-designed or even a rudimentary one.

Figure 4:
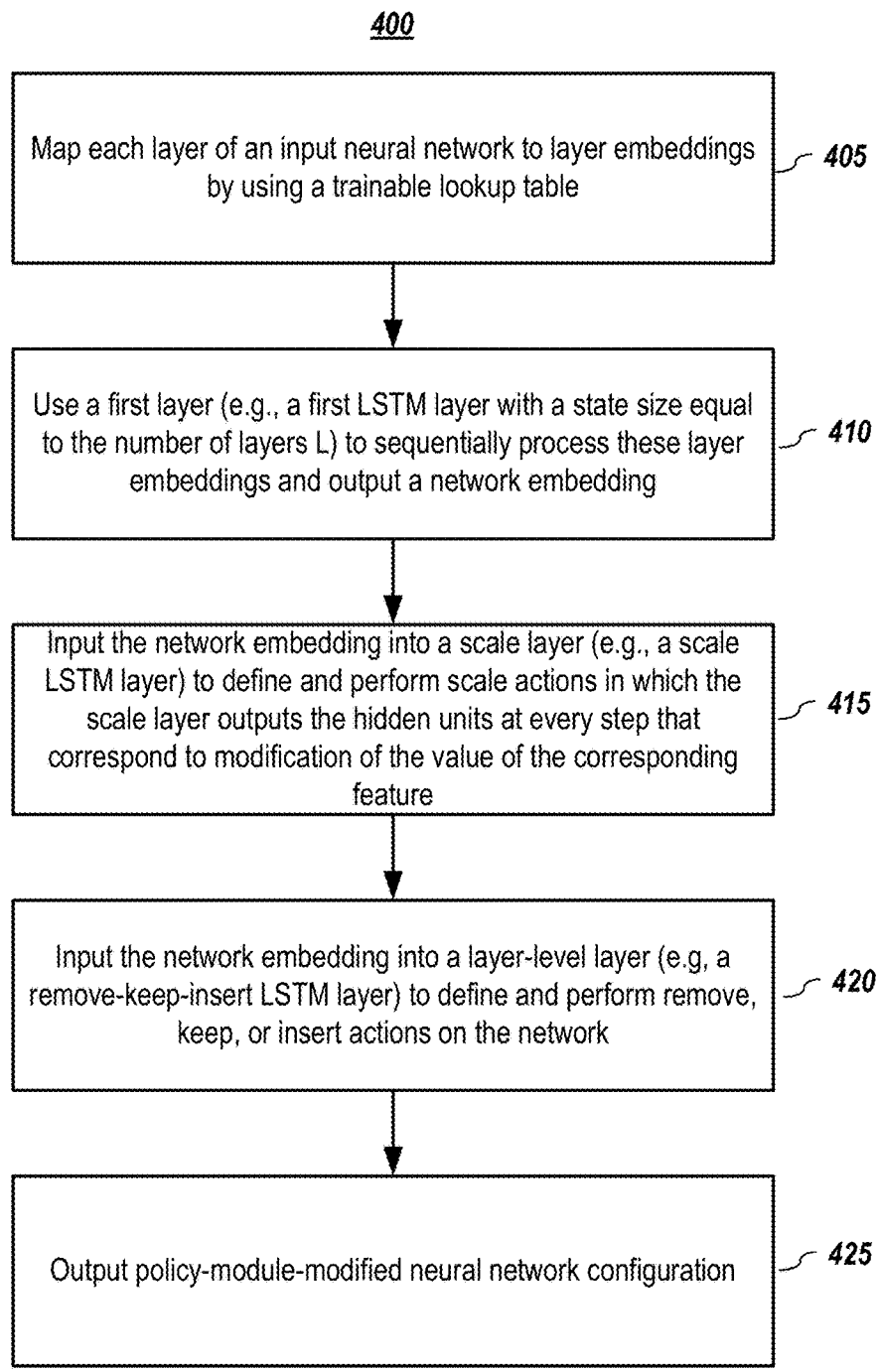
FIG. 4 is a methodology that may be employed by a policy network to adapt a network configuration, according to embodiments of the present disclosure.

FIG. 4 is a methodology that may be employed by a policy network to adapt a network configuration, according to embodiments of the present disclosure. In one or more embodiments, a policy network embodiment 300 uses a network embedding 320 to represent the input neural network configuration 302. As noted above, an aspect of a policy network is its ability to adapt an existing neural architecture rather than building from scratch. To enable network adaptation, in embodiments, a neural network-based embedding network is used to transform an existing neural architecture configuration into a trainable representation. Initially, each layer (e.g., Layer L 305-L) of the input neural network 302 may be mapped (405) to layer embeddings by using a trainable lookup table 310. Then, a long short-term memory (LSTM) layer 315 (with a state size equal to the number of layers L) sequentially processes (410) these layer embeddings and output the network embedding 320.

Figure 5:
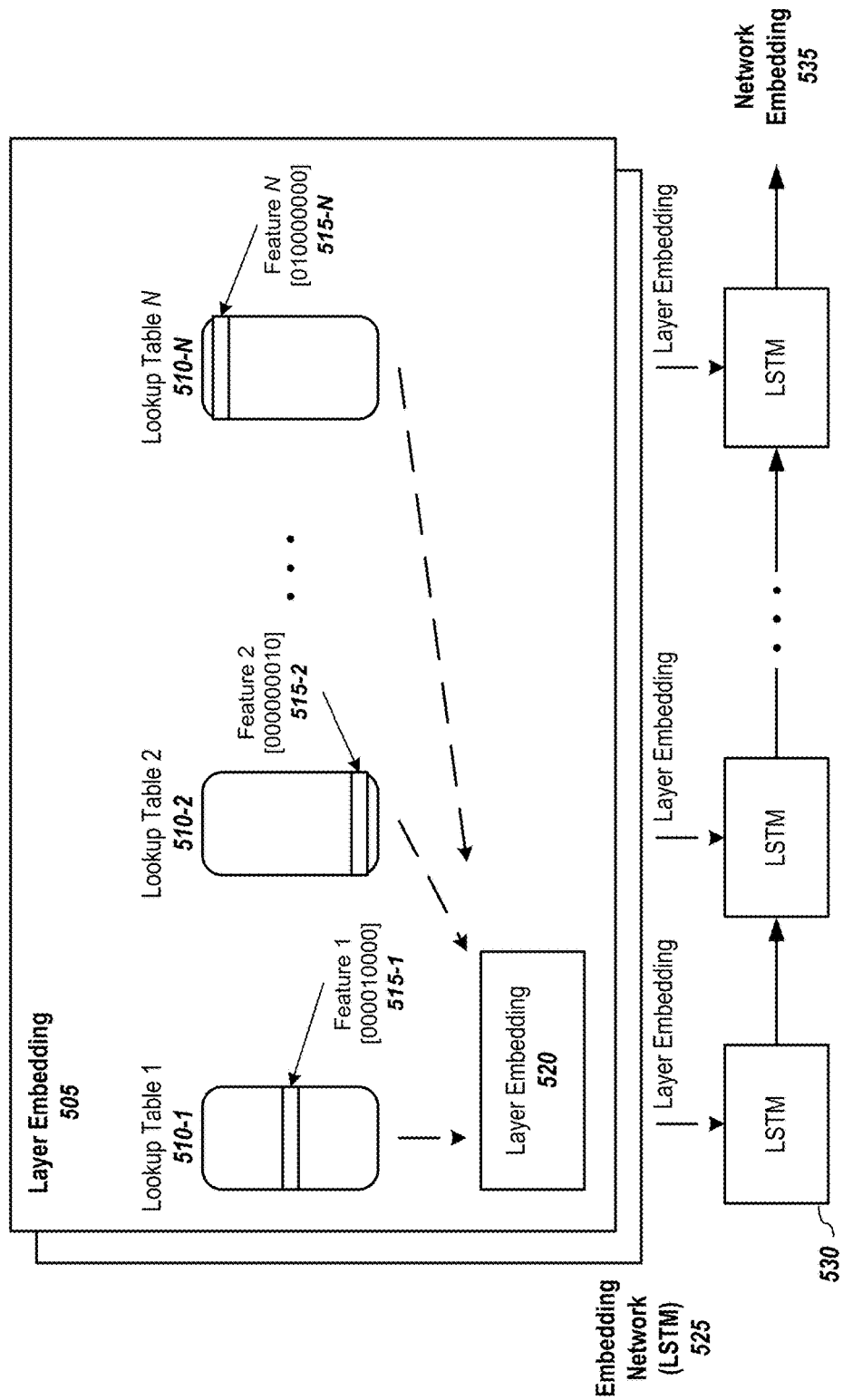
FIG. 5 graphically shows an embedding network, where a layer embedding network takes a layer description and maps layer features into multiple lookup tables, according to embodiments of the present disclosure.

FIG. 5 graphically shows an alternative depiction of an embedding network 500, where a layer embedding network 505 takes a layer description and maps layer features into multiple lookup tables, according to embodiments of the present disclosure. In one or more embodiments, lookup tables (e.g., lookup tables 510-$x$) transform the discrete feature space into trainable feature vectors. An LSTM network takes layer feature vectors (e.g., 515-$x$) and generates a layer embedding 520. After multiple layer embedding have been produced, a network embedding LSTM network 525 processes the sequential information in these layer embeddings and generates a network embedding 535. In one or more embodiments, this network embedding 535 is used as by the policy network and by a value network.

Returning to FIGS. 3 and 4, the network embedding 320 may be input to two different LSTMs (e.g., scale LSTM 325 and insert-keep-remove LSTM 340) to define the scale, insert, keep, and remove actions. In one or more embodiments, the scale LSTM 325 outputs (415) the hidden units at every step which correspond to modification of the value of the corresponding feature. Selection from the predefined set of values may be done using a lookup table 330. For example, if the input network comprises a convolution layer, one state may change the filter width, the next may change the number of filters, and so on. The second LSTM 340 selects (420) between insert, keep, or remove actions based on the output of an additional LSTM state, besides those representing the layer features. Then, either a new layer is inserted and integrated into the scaled neural network or one of the existing layers of the scaled network is removed, or the architecture design remains unchanged.

To encourage exploration, the new layers may be generated in a stochastic way. FIG. 6 depicts a methodology to facilitate architecture configuration exploration using probability mass functions, according to embodiments of the present disclosure. Hence, in one or more embodiments, a goal of the insert LSTM is to define the probability mass function (p.m.f.) (e.g., $PMF_P$ 350-P) to sample (650) the features of the new layer to be generated. For each feature, mapping of the LSTM state output to the p.m.f. may be done by a lookup table 345. For example, if there are three (3) candidate values for the feature of convolution width, the LSTM state output determines three (3) probability values corresponding to them.

Returning to FIGS. 3 & 4, in one or more embodiments, the adapted/new network 365 is defined (425) by implementing the insert/remove action on top of the scale action.

It should be noted that, in one or more embodiments, in one or more embodiments, an LSTM output may be a direction of change in a search space for the value of a particular parameter. For example, an output of −1 may indicate move back one in the search space, an output of +1 may indicate move forward one in the search space, and an output of 0 may indicate to remain at that position in the search space. One skilled in the art shall recognize other implementations may be employed.

2. Search Space

In one or more embodiments, actions of scale and insert are mapped to a search space to define the neural network architectures. Two example approaches to defining search spaces are presented next.

a) Layer-by-Layer Search Embodiments

Figure 7:
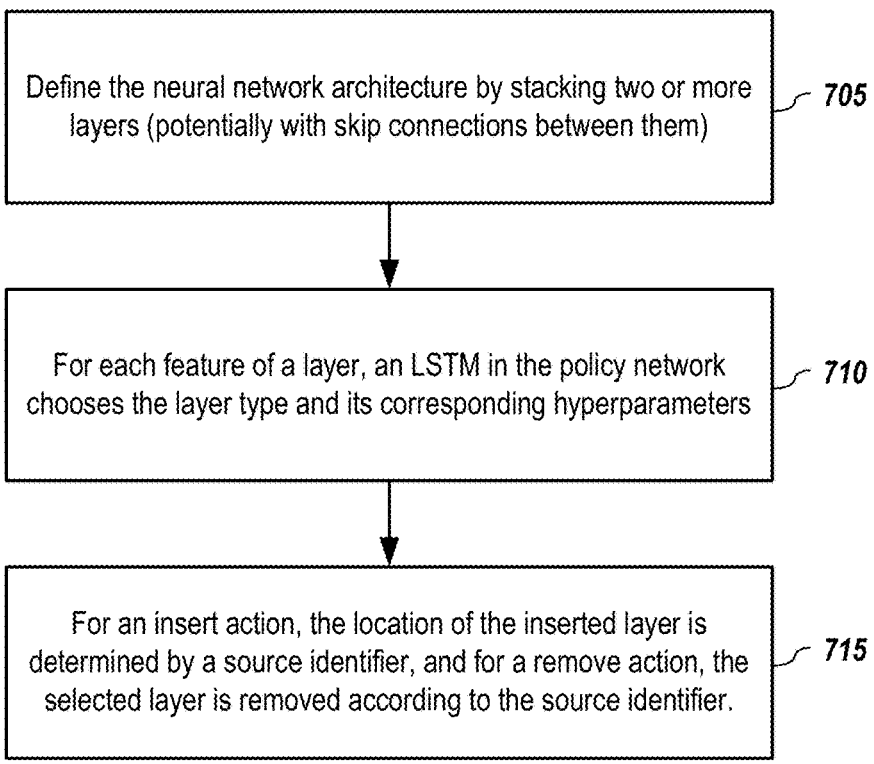
FIG. 7 depicts a layer-by-layer search methodology, according to embodiments of the present disclosure.
Figure 8:
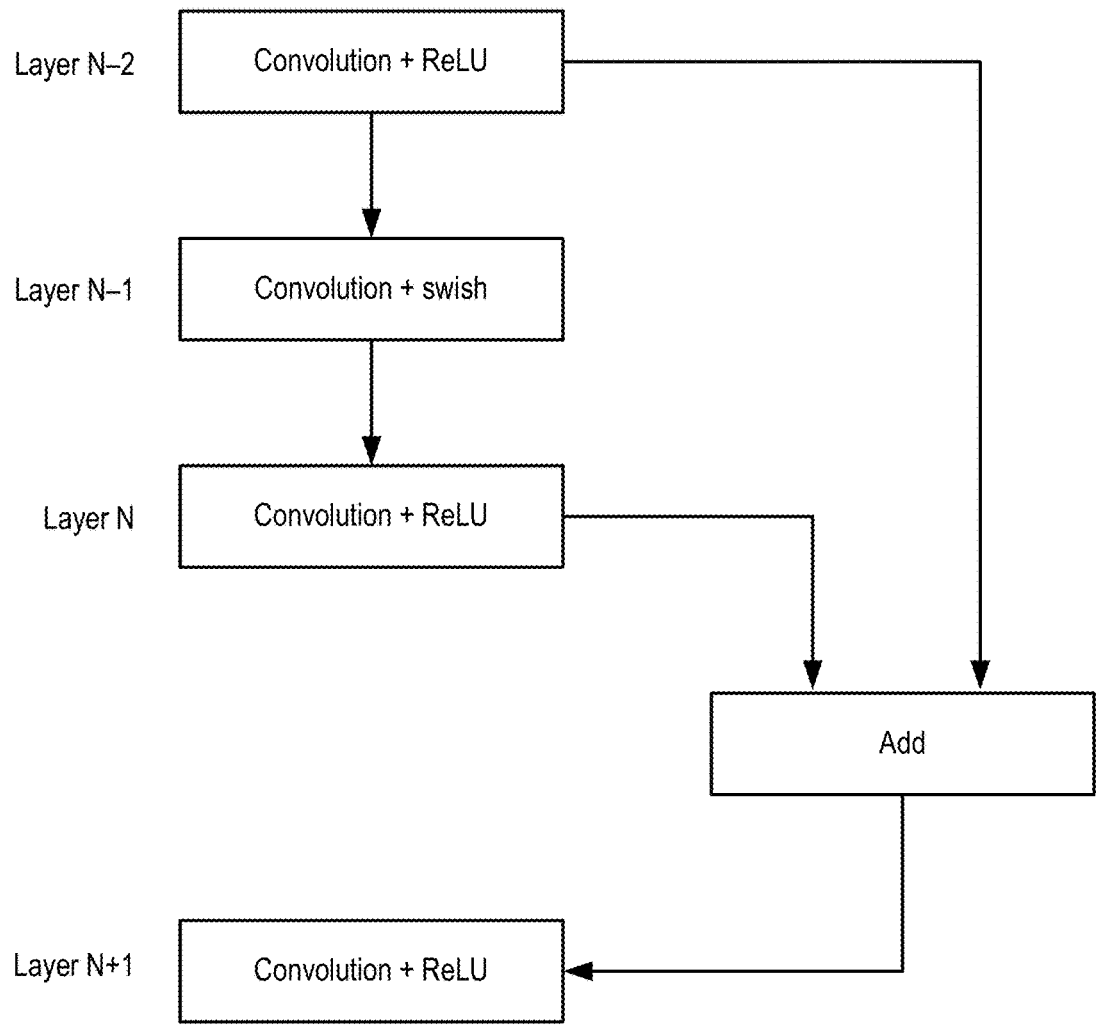
FIG. 8 graphically depicts an example insert operation for layer-by-layer search, according to embodiments of the present disclosure.

In one or more embodiments, layer-by-layer search aims to find the optimal architecture with a search granularity of predefined layers. FIG. 7 depicts a layer-by-layer search methodology, according to embodiments of the present disclosure. In one or more embodiments, the neural network architecture is defined (705) by stacking these layers, potentially with skip connections between them. For each feature, an LSTM in the policy network chooses (710) the layer type and the corresponding hyperparameters (e.g., filter width). In one or more embodiments, the location of the inserted layer is denoted by an input source identifier (e.g., "Src1"), where the new layer gets its input data from. To support skip connection, the Insert Controller generates operation "add" that connects layer outputs of source identifiers (e.g., "Src1" and "Src2") with either an addition or a concatenation operation. FIG. 8 graphically depicts an example insert operation for layer-by-layer search, according to embodiments of the present disclosure.

In one or more embodiments, the search space of a remove action is the list of source identifier(s) as the potentially removable layers of the existing architecture. Therefore, the removed network portion is determined by the chosen source identifier corresponding to a layer.

b) Module Search Embodiments

Module search aims to find an optimal small network module that can be stacked to create the overall neural network. In one or more embodiments, module search enables searching for multi-branch networks while effectively limiting the search space. The insert action in module search no longer inserts a layer but inserts a "branch."

Figure 9:
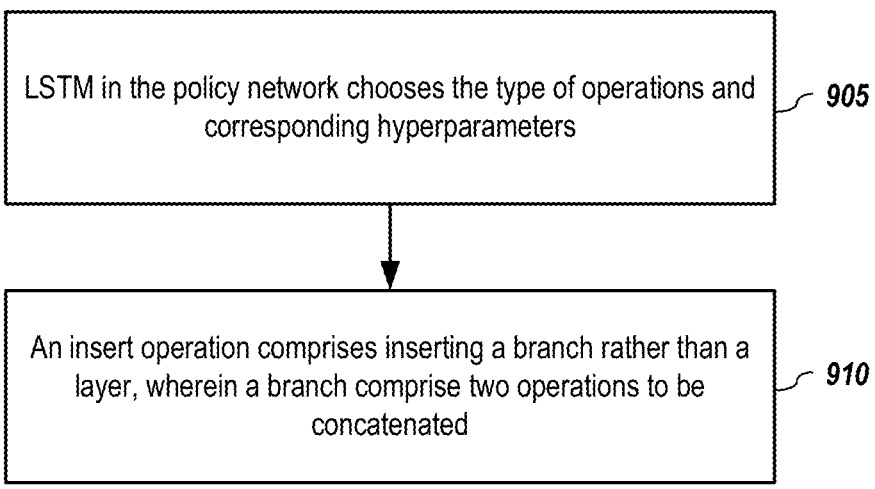
FIG. 9 depicts a module search methodology, according to embodiments of the present disclosure.

FIG. 9 depicts a module search methodology, according to embodiments of the present disclosure. In one or more embodiments, an LSTM in the policy network chooses (905) the types of the operation and the corresponding hyperparameters (e.g., filter width, pooling width, channel size, etc.). In one or more embodiments, each branch comprises (910) two operations to be concatenated; "Src1" and "Src2" determine where these two operations get input values from, and "propagate" determines whether the output of the branch gets passed to the next layer.

Figure 10:
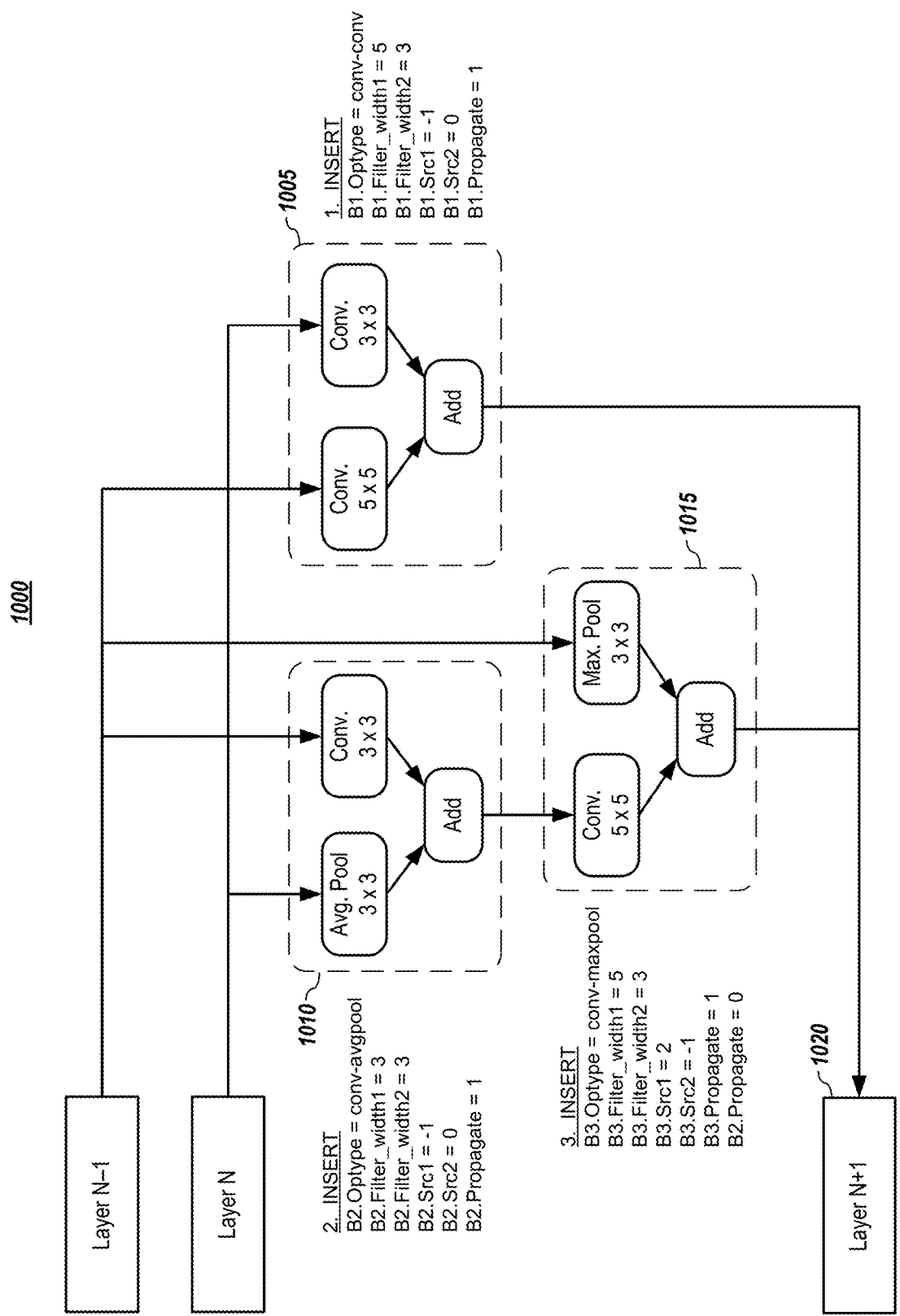
FIG. 10 graphically depicts an example insert operation for module search, according to embodiments of the present disclosure.

FIG. 10 graphically depicts an example insert operation for module search, according to embodiments of the present disclosure. In the depicted example, when branch 3 1015 is inserted, one of its source values is from branch 2 1010. Once it is inserted, it cuts off the connection between branch 2 and the next layer (Layer N+1 1020), and sets the "propagate" feature to denote that the output of branch 2 will be propagated after being processed by branch 3.

3. Policy Gradient with Multi-Objective Reward Embodiments

Figure 11:
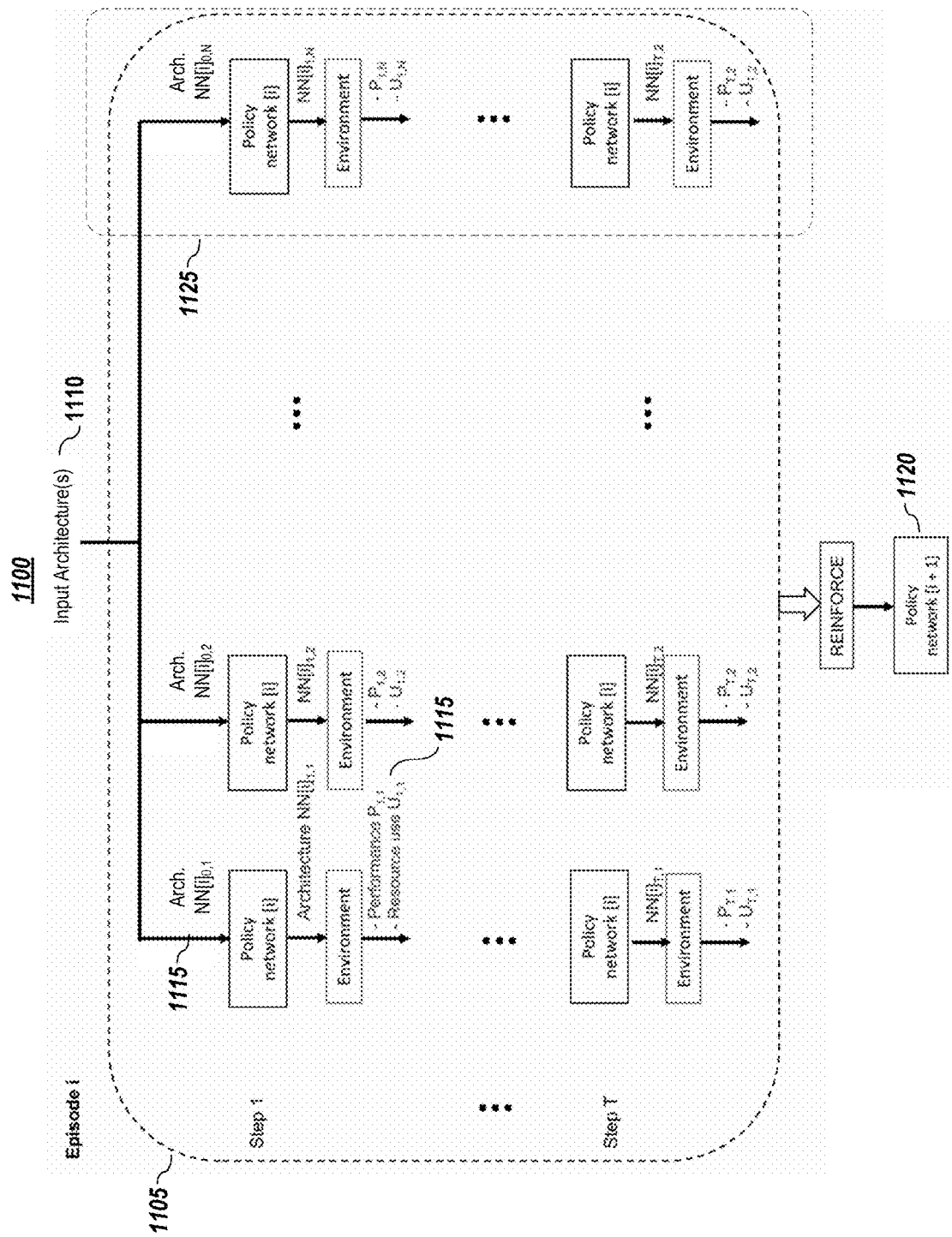
FIG. 11 graphically depicts a reinforcement step for the policy gradient, according to embodiments of the present disclosure.
Figure 12:
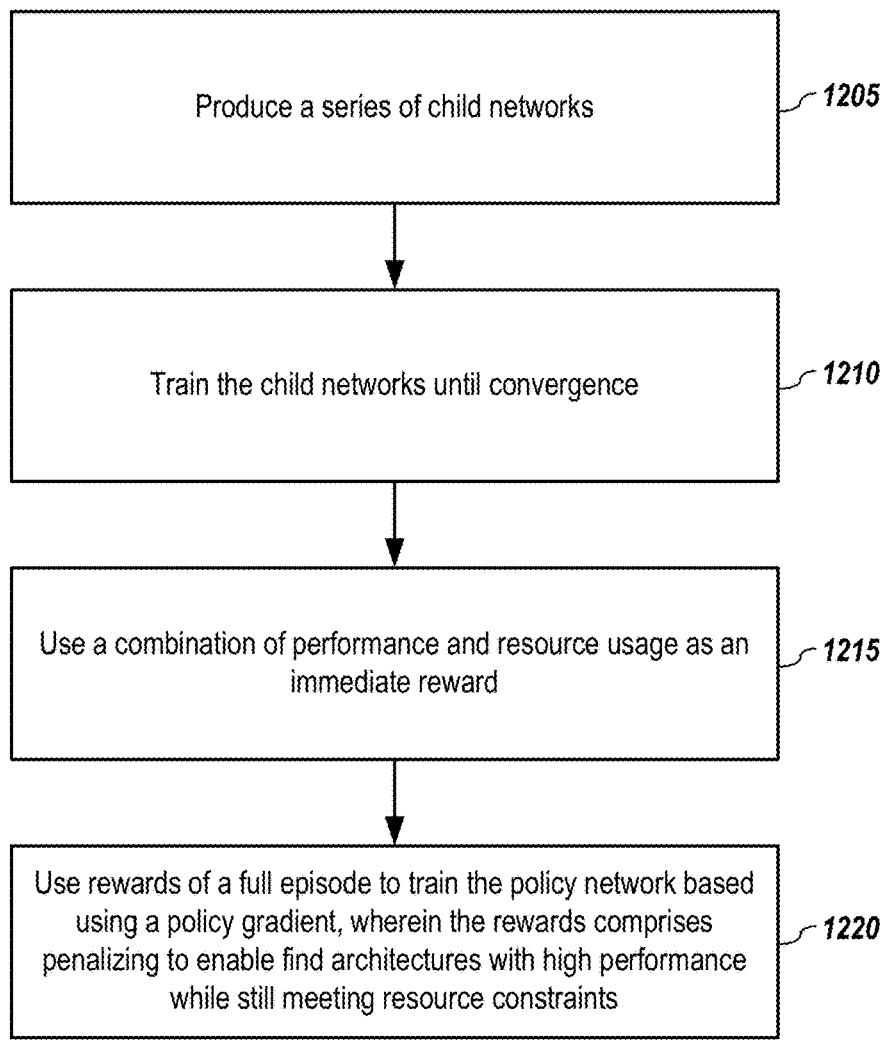
FIG. 12 depicts a general methodology of reinforcement for the policy gradient, according to embodiments of the present disclosure.

FIG. 11 graphically depicts a reinforcement step for the policy gradient, according to embodiments of the present disclosure. N is the number of parallel policy networks to adapt a baseline architecture at episode of i. FIG. 12 depicts a general methodology of reinforcement for the policy gradient, according to embodiments of the present disclosure.

In one or more embodiments, the policy network generates (1205) a batch of actions $a_{t,n}$, which produce a series of child networks, which may be considered in evolutionary branches (e.g., branch 1125 in FIG. 11). In one or more embodiments, the initial network architecture (e.g., Arch. NN[i]$_{0,x}$ 1115) for the start of a branch may be the same for two or more branches (e.g., it may be replicated for each branch from a single input—e.g., an initial network architecture configuration, or the best network architecture configuration from one or more prior episodes). Or, in one or more embodiments, it may be different for two or more branches. For example, in one or more embodiments, the starting network architecture for a branch may be: varied (e.g., randomly varied) from an initial architecture input 1110 (particularly, if this is the first episode); the N best network architectures from one or more prior episodes; a set of N architecture randomly selected from the best Y network architectures from one or more prior episodes may be used, etc. In one or more embodiments, at each step, the child networks are trained (1210) until convergence and a combination of performance and resource use are used (1215) as an immediate reward, as given in Eq. 3 (see also 1115 in FIG. 11). Rewards of a full episode (e.g., episode 1105 in FIG. 11) may be accumulated to train the policy network using the policy gradient to get an updated policy network (e.g., updated policy network 1120):

$$g = \frac{1}{N}\sum_{n=0}^{N-1}\sum_{t=0}^{T-1} \nabla_\theta \log \pi_\theta(a_{t,n} | s_{t,n}) \left(\sum_{t'=t}^{T-1} r_{t',n} - b(s_t)\right) \quad (1)$$

In one or more embodiments, the updated policy network is used for the next episode. The number of episodes may be user-selected or may be based upon one or more stop conditions (e.g., runtime of RENA embodiment, number of iterations, convergence (or difference between iteration is not changing more than a threshold, divergence, and/or performance of the neural network meets criteria).

In one or more embodiments, to get a better estimate of whether the action is in the intended direction, returns may be compared to the expected. The difference $\sum_{t'=t}^{T-1} r_{t',n} - b(s_t)$ is an approximate estimate of the efficacy of action $a_{t,n}$. To reduce the variance, in one or more embodiments, $b(s_t)$ is chosen to estimate the expected sum of rewards:

$$b(s) = \mathbb{E}\left[\sum_{t'=t}^{T-1} r_{t'} \;\middle|\; s_t = s; a_{t:(T-1)} \sim \pi_\theta\right] \quad (2)$$

To find neural architectures that meet multiple resource constraints, a reward based on the model performance may be penalized according to the extent of violating the constraints. Although a fixed hard penalty may be effective for some constraints, it may be challenging for the controller to learn from highly sparse rewards under tight resource constraints. Therefore, in one or more embodiments, a soft continuous penalization method may be used to enable finding architectures with high performance while still meeting all resource constraints. The reward r for a specific architecture with performance P and resource use U (e.g., model size) when exposed to M different resource constraints C may be determined by:

$$r = P \prod_{j=1}^{M} p^{V(U_j, C_j)} \quad (3)$$

where:

$$V(U_j, C_j) = \begin{cases} \max(0, U_j - C_j)/C_j & \text{Constraint } U_j < C_j \\ \min(0, U_j - C_j)/U_j & \text{Constraint } U_j > C_j \end{cases}$$

V(U, C) is the violation function, which determines the extent of violating a constraint depending on the type of the constraint. p is the base penalty, which may be in range of 0 to 1. For the architecture search experiments discussed in this patent document, p=0.9 was used, although other values may be used.

In one or more embodiments, the reward r may be formulated differently as follows:

$$r = P \prod_{j=1}^{M_u} p_j^{V_u(U_j, C_j)} \prod_{j=1}^{M_l} p_j^{V_l(U_j, C_j)}$$

where:
$V_u(U, C) = \max(0, U_j/C_j - 1)$ and
$V_l(U, C) = \min(0, 1 - C_j/U_j)$.

4. Performance Simulation Network and Multi-Objective Reward Embodiments

In one or more embodiments, instead of running the target network till convergence, a regression model or a neural network-based performance prediction may be used to reduce the training time of the policy network.

In one or more embodiments, a performance simulation network takes a target network embedding and a training dataset in terms of size, distribution, and regularity to generate approximated accuracy and training time. Leveraging the embedding network, layer representation may be unified and the information from individual layers may be integrated. Given a set of sample networks, performance curves for each network may be obtained. For each network $x_i$, a validation accuracy $a_i$ and training time $t_i$ may be obtained, for example.

An objective is to reduce the L1 loss of the predicted accuracy and target evaluated accuracy, and the L1 loss of the predicted training time and target training time. Once the performance prediction network is trained properly, it can be fixed and reused for neural architecture search under various resource constraints. The training time network could be used to model a real system (e.g., Tensorflow running on a V100), or it could use a more idealized hardware model (e.g., a roofline model). For the latter case, the trained policy network may be used to guide future hardware and software optimizations. If trained jointly, the performance simulation network becomes a value network V. The parameters θ of the policy network may be optimized via gradient descent as follows:

$$\nabla_\theta \log \pi(a_t|s_t;\theta) A(s_t, a_t;\theta_v)$$

$$A(s_t, a_t) = r_t + \gamma V(s_{t+1}; \theta_v) - V(s_t;\theta_v)$$

The parameters $\theta_v$ if the value network is updated via gradient descent using:

$$\nabla_{\theta_v}[(r_t + \gamma V(s_{t+1}; \theta_v) - V(s_t;\theta_v))^2]$$

In the multi-objective reward function, large models may be penalized by applying a piece-wise linear negative reward function over model size and training time. For instance, one may start applying negative rewards once the model size exceeds a certain threshold memory size, such as 16 MB, for example.

F. Experiments

It shall be noted that these experiments and results are provided by way of illustration and were performed under specific conditions using a specific embodiment or embodiments; accordingly, neither these experiments nor their results shall be used to limit the scope of the disclosure of the current patent document.

1. Image Classification

Image classification is one of the centerpiece problems of visual recognition applications, and it has been a competitive target for NAS given the successful results of highly-tuned neural network architectures. For image classification task, the CIFAR-10 dataset is considered (for the CIFAR-10 dataset, see "Learning Multiple Layers of Features from Tiny Images," Alex Krizhevsky, 2009 (available at www.cs.toronto.edu/~kriz/learning-features-2009-TR.pdf), which is incorporated by reference herein in its entirety). Standard image augmentation techniques, including random flipping, cropping, brightness, and contrast adjustments, are applied. The performance is quantified in terms of the classification accuracy.

a) Training Details

The policy network was trained with the Adam optimizer with a learning rate of 0.0006. The weights of the controller were initialized uniformly between −0.1 and 0.1. At each step, 8 child models were constructed and trained for 150 epochs. The child models were trained with Nesterov momentum with a learning rate following the cosine schedule ($l_{max}$=0.05; $l_{min}$=0.001; $T_0$=10; $T_{mul}$=2). For layer-by-layer search, an episode size of 10 and a batch size of 8 were used. The top eight models from each episode were progressively selected as baseline models to the next episode. We train the best models for longer training time to get SOTA performance. For module search, we restrict the maximum number of branches to be five, as inserting more branches yields very long training time. We use an episode size of 5 and a batch size of 8. The baseline model with only one branch is always used as the baseline for all episodes. The search space is described in Appendix C. An LSTM with 32 hidden units is used for network embedding, while larger LSTMs with 128 hidden units are used for Scale and Insert-Remove actions.

b) Results

Figure 13:
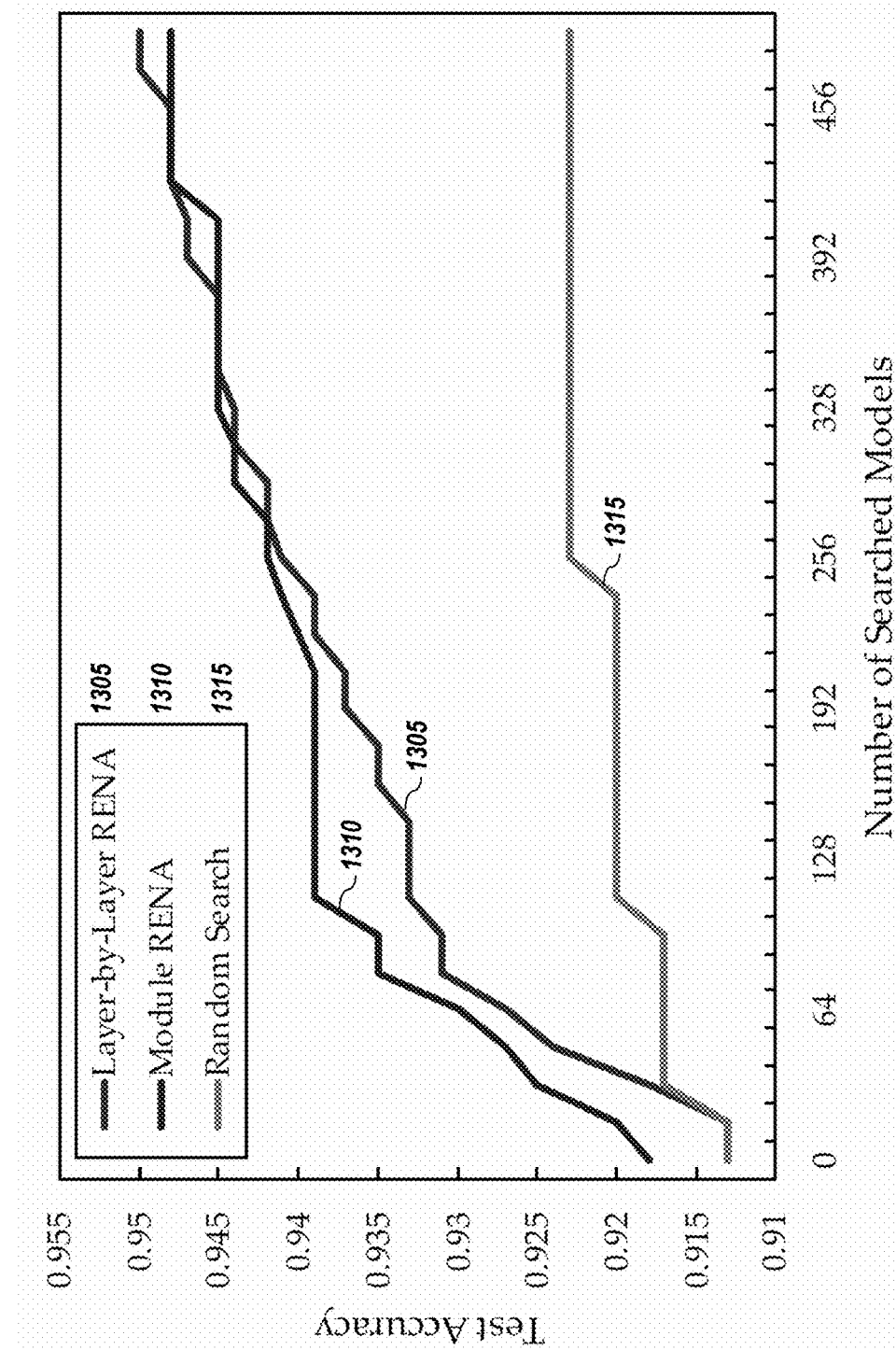
FIG. 13 depicts a graph showing best accuracy versus total searched network architectures for the CIFAR-10 dataset, according to embodiments of the present disclosure.

FIG. 13 depicts a graph showing best accuracy versus total searched network architectures for the CIFAR-10 dataset, according to embodiments of the present disclosure. FIG. 13 shows that the tested RENA embodiment improves the test accuracy up to 95% after 500 searched models, when started with a baseline model with a test accuracy of about 91%. Both layer-by-layer search and module search significantly outperform random search. Table 1 shows the comparison between the RENA embodiments and SOTA models in accuracy, model size, and compute intensity. Popular SOTA models typically has high parameter counts and low compute intensity, compared to the best models found by the RENA embodiment under resource constraints. More specifically, the RENA embodiment is able to find model under 10M parameters with 3.48% test error with 92 FLOPs/Byte compute intensity. With high compute intensity requirements, the RENA embodiment finds models with large channel sizes and large filter widths. The network could even have large channel size for the first few convolution layers. With a tight constraint for both model size and compute intensity, the RENA embodiment finds models with reasonably channel size that use a combination of depth-separable convolution and regular convolution.

TABLE 1

Comparison of RENA embodiments with the state-of-the-art models on the CIFAR-10.

| Model | Resource constraint | Parameters | Test error (%) | Comp. intensity (FLOPs/byte) |
|---|---|---|---|---|
| DenseNet (L = 40, k = 12) | — | 1.02 M | 5.24 | 4.1 |
| DenseNet-BC (k = 24) | — | 15.3 M | 3.62 | 7.1 |
| ResNeXt-29,8 × 64 d | — | 34.4 M | 3.65 | 17.3 |
| RENA: Layer-by-Layer Search | Model size < 10 M | 7.7 M | 3.48 | 92 |
| RENA: Layer-by-Layer Search | Model size < 5 M | 3.4 M | 3.87 | 42 |
| RENA: Layer-by-Layer Search | Comp. intensity > 80 FLOPs/byte | 29 M | 2.95 | 107 |
| RENA: Module Search | Model size < 3 M | 2.2 M | 3.98 | 3.9 |
| RENA: Module Search | Model size < 5 M | 4.0 M | 3.22 | 4.2 |

2. Keyword Spotting

Keyword spotting (KWS) systems aim to detect a particular keyword from a continuous stream of audio. They are commonly used in conversational human-machine interfaces, such as in smart home systems or virtual assistants. A high detection accuracy and a low latency is critical to enable satisfactory user experience. In addition, KWS systems are typically deployed on a wide range of devices with different resource constraints. Therefore, an optimal resource-constrained neural architecture design is very crucial.

For KWS task, the Google speech commands dataset. Similar to Y. Zhang, N. Suda, L. Lai, and V. Chandra, "Hello Edge: Keyword Spotting on Microcontrollers." arXiv: 1711.07128, November 2017 (hereinafter "[Zhang et al., 2017]"), the KWS problem with 12 classes was considered. The dataset split was also similar to [Zhang et al., 2017] that training, validation, and test sets have the ratio of 80:10:10, while making sure that the audio clips from the same person stays in the same set. The performance is quantified in terms of the classification accuracy. Further details are given in Appendix B.

a) Training Details

For KWS architecture search, layer-by-layer search was considered, while always starting from a small baseline architecture, i.e. a single fully connected layer with 12 hidden units, which yields a test accuracy of 65%. The policy network was trained with the Adam optimization algorithm with a learning rate of 0.0006. An episode size of 5 and a batch size of 10 was used for all experiments, i.e. 10 child models are trained concurrently. The search space is given in Appendix C. Each model was evaluated after training and an action is selected according to the current policy in order to transform the network. At the end of each episode, the policy was updated and the best 10 child models were used as the baseline for the new episode. The weights of the controller were initialized uniformly between −0.1 and 0.1. The size of LSTMs for network embedding and the controllers are similar to those of the image classification task.

b) Results

Figure 14:
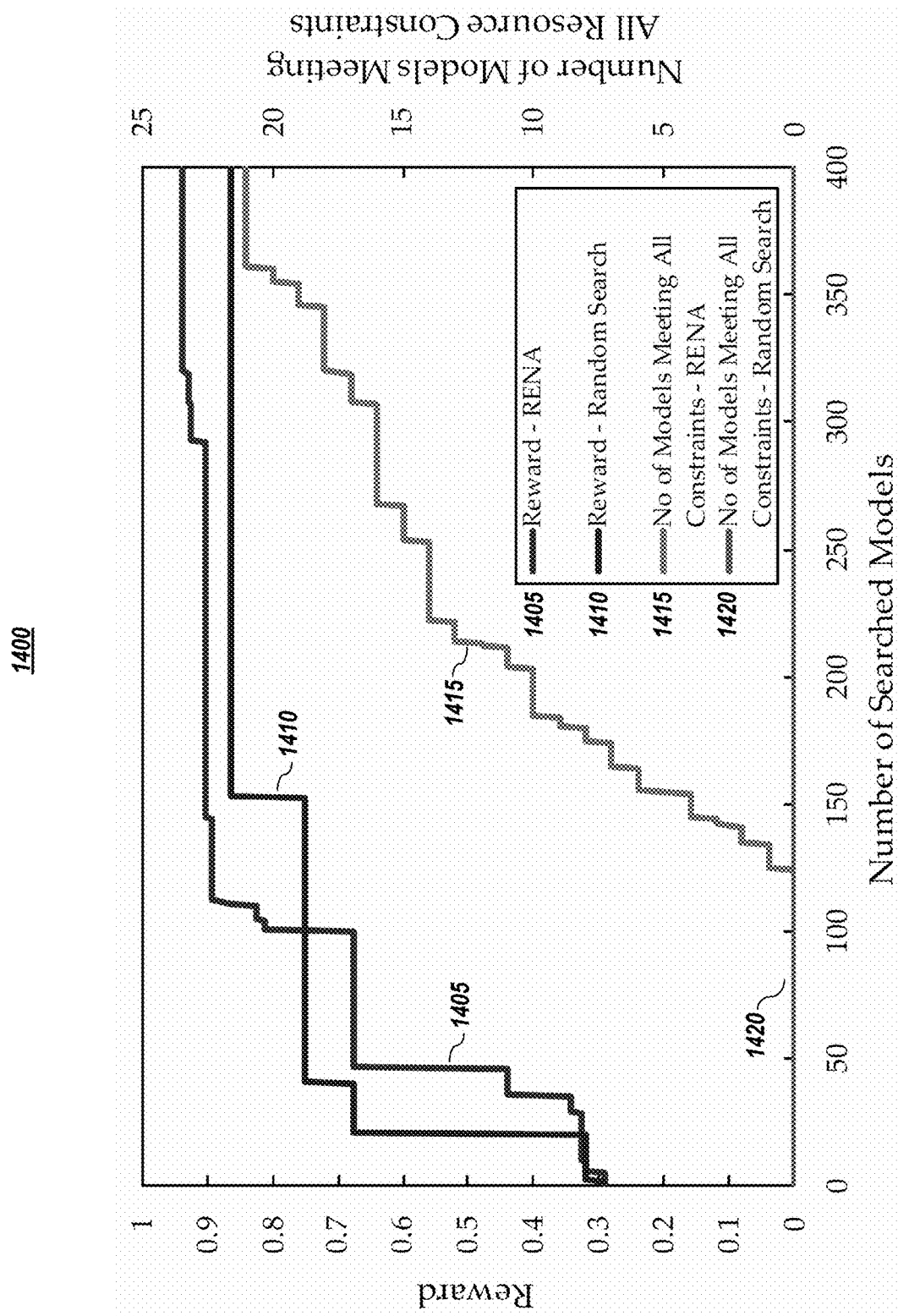
FIG. 14 depicts a graph showing comparison between RENA embodiments and Random Search for a resource-constrained architecture search for the Google Speech Commands Dataset, according to embodiments of the present disclosure.

FIG. 14 depicts a graph showing comparison between a RENA embodiment and Random Search for a resource-constrained architecture search for the Google Speech Commands Dataset, according to embodiments of the present disclosure. The Random Search generates random actions (i.e., insert, remove, and scale) and also selects the hyper-parameters of each layer randomly with uniform probability. As shown, FIG. 14 compares the effectiveness of the RENA embodiment versus Random Search in finding a resource-constrained architecture (size <0.1 M and compute intensity >10) in terms of reward and number of models meeting both constraints. As illustrated in the figure, the RENA embodiment learns to generate models that meet both constraints after about 120 searched models, whereas Random Search is not able to generate any models meeting both constraints within 400 searched models. The RENA embodiment attempts to maximize the model performance in this domain and finally finds an architecture with 93.65% test accuracy that meets both resource constraints. Random Search can barely find a model that violate the constraints by a small margin (model size=0.13 M and compute intensity=10.69 FLOPs/byte).

TABLE 2 presents the search results for KWS, as well as the optimal architectures. Without any resource constraints, the state-of-the-art accuracy, 95.81%, can be obtained using an architecture comprising depth-separable convolutions (that apply significant downsampling), followed by gated recurrent units (GRUs) and multiple 2-D convolutions. When aggressive resource constraints are imposed, it was observed that the RENA embodiment can find architectures that outperform hand-optimized architectures in the literature. A tight model size constraint results in an optimal architecture composed of GRUs with small hidden units. Similarly, tight constraints on computational complexity also favor for GRUs with small hidden units. When compute intensity is considered, an efficient architecture is achieved by enabling most of the computation on 2-D convolutions with large channel size. Lastly, joint constraints were considered, and it was observed that very competitive accuracy results can be obtained even in the regime of a small feasible architecture space. For example, the RENA embodiment finds models under 0.1M parameters with high compute intensity (>10 FLOPs/Byte) with 93.65% test accuracy. It was observed the benefits of high compute intensity and low computational complexity for low inference latency, as expected.

TABLE 2

Comparison of KWS models found by a RENA embodiment and previous state-of-the-art (SOTA) models. Conv2d (2-D convolution) and DS-Conv2d (2-D depth-separable convolution) are parametrized by the number of layers, channel size, kernel size in time and frequency, and stride in time and frequency, respectively. GRU is parametrized by the number of layers, number of hidden units, and the number of directions. FC (fully connected) is parametrized by number of layers and number of hidden units. AvgPool2d (2-D average pooling) is parametrized by pooling in time and frequency.

| Model | Resource constraints | Architecture | Parameters | Test accuracy (%) | Compute complexity (GFLOPs) | Compute intensity (FLOPs/byte) |
|---|---|---|---|---|---|---|
| RENA: Layer-by-Layer Search | — | DS-Conv2d (1, 4, 4, 1, 1, 1) GRU (1, 64, 1) GRU (1, 128, 1) Conv2d (1, 12, 16, 2, 4, 4) Conv2d (1, 4, 16, 4, 4, 4) Conv2d (1, 64, 16, 4, 4, 4) FC (1, 32) | 0.143M | 95.81 | 3.39 | 3.58 |
| RENA: Layer-by-Layer Search | Model size <0.05M | GRU (2, 64, 1) | 0.047M | 94.04 | 1.40 | 3.69 |
| DS-CNN [Zhang et al., 2017] | — | Conv2d(1, 64, 10, 4, 2, 2) DS-Conv2d (4, 64, 3, 3, 1, 1) AvgPool2d | 0.023M | 93.39 | 6.07 | 1.76 |
| RENA: Layer-by-Layer Search | Model size <0.1M | Conv2d (3, 32, 4, 8, 1, 3) AvgPool2d | 0.067M | 94.82 | 6.53 | 8.11 |
| RENA: Layer-by-Layer Search | Comp. complexity <1 GFLOPs | GRU (3, 32, 1) FC (1, 256) | 0.425M | 93.16 | 0.89 | 2.45 |

TABLE 2-continued

Comparison of KWS models found by a RENA embodiment and previous state-of-the-art (SOTA) models. Conv2d (2-D convolution) and DS-Conv2d (2-D depth-separable convolution) are parametrized by the number of layers, channel size, kernel size in time and frequency, and stride in time and frequency, respectively. GRU is parametrized by the number of layers, number of hidden units, and the number of directions. FC (fully connected) is parametrized by number of layers and number of hidden units. AvgPool2d (2-D average pooling) is parametrized by pooling in time and frequency.

| Model | Resource constraints | Architecture | Parameters | Test accuracy (%) | Compute complexity (GFLOPs) | Compute intensity (FLOPs/byte) |
|---|---|---|---|---|---|---|
| GRU [Zhang et al., 2017] | — | GRU (1, 154, 1) | 0.093M | 92.94 | 0.68 | 5.03 |
| RENA: Layer-by-Layer Search | Comp. complexity <5 GFLOPs | GRU (5, 64, 1) FC (2, 16) | 0.171M | 95.02 | 3.30 | 6.38 |
| RENA: Layer-by-Layer Search | Comp. intensity >10 FLOPs/byte | GRU (3, 128, 2) | 0.733M | 95.64 | 13.59 | 21.83 |
| CRNN [Zhang et al., 2017] | — | Conv2d (1, 100, 10, 4, 2, 1) GRU (2, 136, 1) FC (1, 188) | 2.447M | 94.40 | 46.21 | 15.76 |
| RENA: Layer-by-Layer Search | Comp. intensity >50 FLOPs/byte | Conv2d (3, 192, 8, 4, 1, 3) AvgPool2d (8, 1) FC (2, 16) | 2.626M | 95.18 | 210.13 | 58.70 |
| RENA: Layer-by-Layer Search | Model size <0.1M Comp. intensity >10 FLOPs/byte | Conv2d (2, 32, 20, 2, 1, 2) GRU (3, 16, 1) GRU (2, 12, 1) Conv2d (2, 4, 20, 8, 1, 2) | 0.074M | 93.65 | 12.57 | 10.29 |
| RENA: Layer-by-Layer Search | Model size <0.1M Comp. complexity <1 GFLOPs | GRU (2, 32, 2) | 0.035M | 93.07 | 1.00 | 2.77 |

G. Some Conclusions

Presented herein are embodiments of resource-aware multi-objective reinforcement learning-based Neural Architecture Search (NAS) with network embedding, which may be referred to generally as Resource-Efficient Neural Architect (RENA). Embodiments of RENA comprise a policy network, which is designed to process the network embedding by predefined actions to create new network configurations. Embodiments of the framework achieve sample-efficient search—RENA achieves >95% accuracy for CIFAR-10 within 500 total searched models. Besides, a framework to integrate resource constraints in automated NAS was demonstrated. Constraints were imposed by modifying the reward function to penalize cases when the generated models violated the constraints. It was demonstrated that a RENA-generated model can achieve very competitive results for image recognition (on CIFAR-10 Dataset) and keyword spotting (on Google Speech Commands Dataset) even with tight constraints.

H. Appendices

1. Appendix A—Complexity Modeling

Complexity of mathematical operations may be represented by the total number of algorithmic FLOPs without considering hardware-specific logic-level implementations. Such a complexity metric also has limitations of representing some major sources of power consumption, such as loading and storing data.

In one or more embodiments, all point-wise operations (including nonlinearities) were counted as 1 FLOP, which is motivated with the trend of implementing most mathematical operations as a single instruction. In one or more embodiments, the complexities of register memory-move operations were ignored. It was assumed that a matrix-matrix multiply, between W, an m×n matrix, and X, an n×p matrix, takes 2 mnp FLOPs. Similar expression is generalized for multi-dimensional tensors, that are used in convolutional layers. For real-valued fast Fourier transform (FFT), it was assumed in embodiments that the complexity of 2.5N $\log_2$ (N) FLOPs for a vector of length N. For most operations used in this patent document, Tensorflow profiling tool includes FLOP counts, which was used directly.

2. Appendix B—Training Details for KWS Models

The raw time-domain input audio samples have a duration of 1 second, sampled at a rate of 16 kHz. Speech features are extracted using 40 Mel-frequency cepstral coefficients (MFCC) with a hop length of 20 ms and a window length of 40 ms, yielding 2-D spectrograms with dimensions of 49×40. Random time-jittering of 100 ms was applied for augmentation. In addition, 80 percent of training and test samples were augmented by applying additive noise with a signal-to-noise ratio (SNR) in range of [10,20] dB, sampled from the background noise data in the dataset.

The ADAM optimization algorithm was used for training each KWS model, with a batch size of 128 and an initial learning rate of 0.001. The learning is dropped by 0.2 every 10,000 training iterations. Due to the small scale of the problem, a cross entropy (CE) loss function was used for training.

3. Appendix C—Search Space

Table 3, Table 4, and Table 5 demonstrate the search space for the tested image recognition and KWS embodiments.

TABLE 3

Search space of scale and insert actions in layer-by-layer search for image classification.

| Feature | Search space |
|---|---|
| Layer type | [conv2d, dep-sep-conv2d, MaxPool2d, add] |
| Filter width | [3, 5, 7] |
| Pooling width | [2, 3] |
| Channel size | [16, 32, 64, 96, 128, 256] |
| Nonlinear activation | ["relu", "crelu", "elu", "selu", "swish"] |
| Src1 Layer | [i for i in range(MAX_LAYERS)] |
| Src2 Layer | [i for i in range(MAX_LAYERS)] |

TABLE 4

Search space of scale and insert actions in layer-by-layer search for keyword spotting.

| Feature | Search space |
| --- | --- |
| Layer type | [conv2d, dep-sep-conv2d, dilated-conv2d, GRU, AvgPool2d, FC] |
| Number of Layers | [1, 2, 3, 4, 5] |
| Kernel size in time | [1, 4, 8, 16, 20] |
| Kernel size in frequency | [1, 2, 4, 8, 10] |
| Channel size (or hidden units) | [4, 12, 16, 32, 64, 128, 192, 256] |
| Stride in time | [1, 2, 4, 8, 10] |
| Stride in frequency (or dilation rate) | [1, 2, 3, 4, 5] |
| Number of GRU directions | [1, 2] |
| Dropout rate | [0.8, 0.9, 1.0] |
| Src1 Layer | [i for i in range (MAX_LAYERS)] |
| Src2 Layer | [i for i in range (MAX_LAYERS)] |

TABLE 5

Search space for scale and insert actions in module search for image classification.

| Feature | Search space |
| --- | --- |
| Branch type | [conv-conv, conv-maxpool, conv-avgpool, conv-none, maxpool-none, avgpool-none, 1 × 7-7 × 1-none] |
| Filter width | [3, 5, 7] |
| Pooling width | [2, 3] |
| Channel size | [8, 12, 16, 24, 32] |
| Src1 Layer | [i for i in range (MAX_BRANCHES + 1)] |
| Src2 Layer | [i for i in range (MAX_BRANCHES + 1)] |
| Propagate | [0, 1] |

I. Computing System Embodiments

In embodiments, aspects of the present patent document may be directed to, may include, or may be implemented on one or more information handling systems/computing systems. A computing system may include any instrumentality or aggregate of instrumentalities operable to compute, calculate, determine, classify, process, transmit, receive, retrieve, originate, route, switch, store, display, communicate, manifest, detect, record, reproduce, handle, or utilize any form of information, intelligence, or data. For example, a computing system may be or may include a personal computer (e.g., laptop), tablet computer, phablet, personal digital assistant (PDA), smart phone, smart watch, smart package, server (e.g., blade server or rack server), a network storage device, camera, or any other suitable device and may vary in size, shape, performance, functionality, and price. The computing system may include random access memory (RAM), one or more processing resources such as a central processing unit (CPU) or hardware or software control logic, ROM, and/or other types of memory. Additional components of the computing system may include one or more disk drives, one or more network ports for communicating with external devices as well as various input and output (I/O) devices, such as a keyboard, a mouse, touchscreen and/or a video display. The computing system may also include one or more buses operable to transmit communications between the various hardware components.

Figure 15:
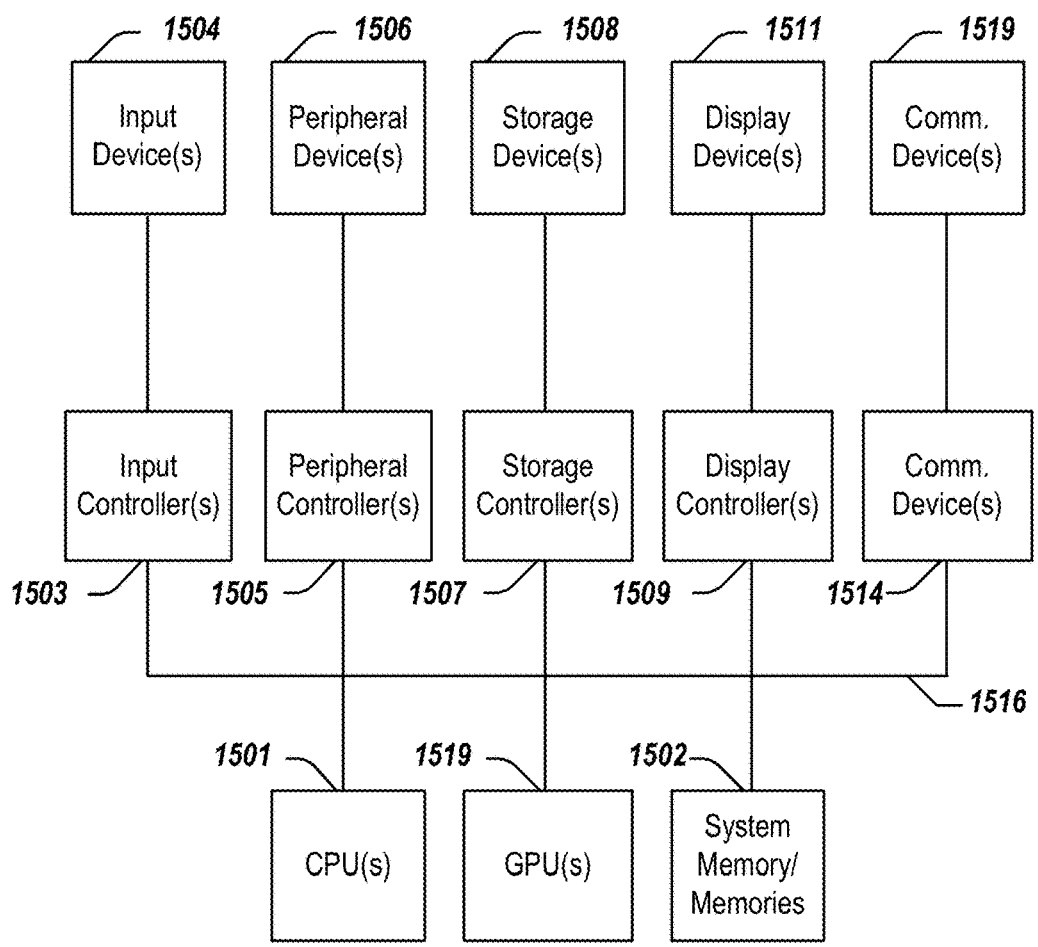
FIG. 15 depicts a simplified block diagram of a computing device/information handling system, in accordance with embodiments of the present document.

FIG. 15 depicts a simplified block diagram of a computing device/information handling system (or computing system) according to embodiments of the present disclosure. It will be understood that the functionalities shown for system 1500 may operate to support various embodiments of a computing system—although it shall be understood that a computing system may be differently configured and include different components, including having fewer or more components as depicted in FIG. 15.

As illustrated in FIG. 15, the computing system 1500 includes one or more central processing units (CPU) 1501 that provides computing resources and controls the computer. CPU 1501 may be implemented with a microprocessor or the like, and may also include one or more graphics processing units (GPU) 1519 and/or a floating-point coprocessor for mathematical computations. System 1500 may also include a system memory 1502, which may be in the form of random-access memory (RAM), read-only memory (ROM), or both.

A number of controllers and peripheral devices may also be provided, as shown in FIG. 15. An input controller 1503 represents an interface to various input device(s) 1504, such as a keyboard, mouse, touchscreen, and/or stylus. The computing system 1500 may also include a storage controller 1507 for interfacing with one or more storage devices 1508 each of which includes a storage medium such as magnetic tape or disk, or an optical medium that might be used to record programs of instructions for operating systems, utilities, and applications, which may include embodiments of programs that implement various aspects of the present disclosure. Storage device(s) 1508 may also be used to store processed data or data to be processed in accordance with the disclosure. The system 1500 may also include a display controller 1509 for providing an interface to a display device 1511, which may be a cathode ray tube (CRT), a thin film transistor (TFT) display, organic light-emitting diode, electroluminescent panel, plasma panel, or other type of display. The computing system 1500 may also include one or more peripheral controllers or interfaces 1505 for one or more peripherals 1506. Examples of peripherals may include one or more printers, scanners, input devices, output devices, sensors, and the like. A communications controller 1514 may interface with one or more communication devices 1515, which enables the system 1500 to connect to remote devices through any of a variety of networks including the Internet, a cloud resource (e.g., an Ethernet cloud, a Fiber Channel over Ethernet (FCoE)/Data Center Bridging (DCB) cloud, etc.), a local area network (LAN), a wide area network (WAN), a storage area network (SAN) or through any suitable electromagnetic carrier signals including infrared signals.

In the illustrated system, all major system components may connect to a bus 1516, which may represent more than one physical bus. However, various system components may or may not be in physical proximity to one another. For example, input data and/or output data may be remotely transmitted from one physical location to another. In addition, programs that implement various aspects of the disclosure may be accessed from a remote location (e.g., a server) over a network. Such data and/or programs may be conveyed through any of a variety of machine-readable medium including, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices.

Aspects of the present disclosure may be encoded upon one or more non-transitory computer-readable media with instructions for one or more processors or processing units to cause steps to be performed. It shall be noted that the one or more non-transitory computer-readable media shall include volatile and non-volatile memory. It shall be noted that alternative implementations are possible, including a hardware implementation or a software/hardware implementation. Hardware-implemented functions may be realized using ASIC(s), programmable arrays, digital signal processing circuitry, or the like. Accordingly, the "means" terms in any claims are intended to cover both software and hardware implementations. Similarly, the term "computer-readable medium or media" as used herein includes software and/or hardware having a program of instructions embodied thereon, or a combination thereof. With these implementation alternatives in mind, it is to be understood that the figures and accompanying description provide the functional information one skilled in the art would require to write program code (i.e., software) and/or to fabricate circuits (i.e., hardware) to perform the processing required.

It shall be noted that embodiments of the present disclosure may further relate to computer products with a non-transitory, tangible computer-readable medium that have computer code thereon for performing various computer-implemented operations. The media and computer code may be those specially designed and constructed for the purposes of the present disclosure, or they may be of the kind known or available to those having skill in the relevant arts. Examples of tangible computer-readable media include, but are not limited to: magnetic media such as hard disks, floppy disks, and magnetic tape; optical media such as CD-ROMs and holographic devices; magneto-optical media; and hardware devices that are specially configured to store or to store and execute program code, such as application specific integrated circuits (ASICs), programmable logic devices (PLDs), flash memory devices, and ROM and RAM devices. Examples of computer code include machine code, such as produced by a compiler, and files containing higher level code that are executed by a computer using an interpreter. Embodiments of the present disclosure may be implemented in whole or in part as machine-executable instructions that may be in program modules that are executed by a processing device. Examples of program modules include libraries, programs, routines, objects, components, and data structures. In distributed computing environments, program modules may be physically located in settings that are local, remote, or both.

One skilled in the art will recognize no computing system or programming language is critical to the practice of the present disclosure. One skilled in the art will also recognize that a number of the elements described above may be physically and/or functionally separated into sub-modules or combined together.

It will be appreciated to those skilled in the art that the preceding examples and embodiments are exemplary and not limiting to the scope of the present disclosure. It is intended that all permutations, enhancements, equivalents, combinations, and improvements thereto that are apparent to those skilled in the art upon a reading of the specification and a study of the drawings are included within the true spirit and scope of the present disclosure. It shall also be noted that elements of any claims may be arranged differently including having multiple dependencies, configurations, and combinations.

What is claimed is:

1. A computer-implemented method for performing neural architecture searching, comprising:

using a policy network comprising a network embedding neural network, a scale neural network, and an action neural network:

converting a neural network architecture into a network embedding of the neural network architecture using the network embedding neural network, in which the neural network architecture comprises one or more layers, one or more network modules, or both, and each of the one or more layers or one or more modules has at least one corresponding feature;

using the scale neural network, which receives the network embedding of the neural network architecture, identifying a value for each of one or more features of the neural network architecture;

using the action neural network, which receives the network embedding of the neural network architecture, determining whether to remove a portion of the network architecture, keep a portion of the network architecture, or add a portion to the network architecture, wherein a portion of the network architecture is a layer or is one or more modules;

creating an altered neural network architecture by:

responsive to the action neural network indicating to remove a portion, removing the portion from the network architecture and adjusting one or more inputs to account for the removed portion;

responsive to the action neural network indicating to keep a portion, altering one or more features of the neural network architecture as indicated by the scale neural network; and responsive to the action neural network indicating to insert a portion, altering the neural network architecture by inserting the portion with features, in which the portion and its features are sampled from a distribution; and outputting the altered neural network architecture.

2. The computer-implemented method of claim 1 further comprising:

training the altered neural network architecture until convergence;

determining one or more performance metrics and one or more resources usage metrics of the trained altered neural network architecture when operating under a plurality of resource constraint environments; and determining an immediate reward for the altered neural network architecture based upon at least some of the one or more performance metrics and the one or more resources usage metrics.

3. The computer-implemented method of claim 2 further comprising:

repeating, until a stop condition is reached, having the altered neural network architecture be the neural network architecture and generating a set of trained altered neural network architectures and their corresponding immediate rewards.

4. The computer-implemented method of claim 3 further comprises the steps of:

generating at least one additional set of trained altered neural network architectures and their corresponding immediate rewards for the policy network.

5. The computer-implemented method of claim 4 further comprising:

applying a policy gradient that uses at least some of the corresponding immediate rewards of the sets of trained altered neural network architectures to update the policy network to form an updated policy network.

6. The computer-implemented method of claim 5 wherein further comprises the steps of:
  repeating, until a stop condition is reached:
    having the updated policy network be the policy network;
    selecting a starting neural network architecture using its corresponding immediate reward;
    generating a final set of trained altered neural network architectures and their corresponding immediate rewards; and
    selecting an altered neural network architecture from the final set of trained altered neural network architectures for a use with specific resource constraints.

7. The computer-implemented method of claim 1 wherein an output of the action neural network is a direction of change in a search space and the computer-implemented method further comprises:
  defining a search space comprising neural network layer type and its corresponding feature or features, module type and its corresponding feature or features, or both, which is used in conjunction with the output of the action neural network to determine specific alterations of the neural network architecture.

8. The computer-implemented method of claim 1 wherein the distribution from which the portion and its features are sampled is done using one or more trainable probability mass functions.

9. A neural network architect system comprising:
  one or more processors; and
  a non-transitory computer-readable medium or media comprising one or more sequences of instructions which, when executed by at least one of the one or more processors, causes steps to be performed comprising:
    using a policy network comprising a network embedding neural network, a scale neural network, and an action neural network:
      converting a neural network architecture into a network embedding of the neural network architecture using the network embedding neural network, in which the neural network architecture comprises one or more layers, one or more network modules, or both, and each of the one or more layers or one or more modules has at least one corresponding feature;
      using the scale neural network, which receives the network embedding of the neural network architecture, identifying a value for each of one or more features of the neural network architecture;
      using the action neural network, which receives the network embedding of the neural network architecture, determining whether to remove a portion of the network architecture, keep a portion of the network architecture, or add a portion to the network architecture, wherein a portion of the network architecture is a layer or is one or more modules;
      creating an altered neural network architecture by:
        responsive to the action neural network indicating to remove a portion, removing the portion from the network architecture and adjusting one or more inputs to account for the removed portion;
        responsive to the action neural network indicating to keep a portion, altering one or more features of the neural network architecture as indicated by the scale neural network; and
        responsive to the action neural network indicating to insert a portion, altering the neural network architecture by inserting the portion with features, in which the portion and its features are sampled from a distribution; and
      outputting the altered neural network architecture.

10. The neural network architect system of claim 9 wherein the non-transitory computer-readable medium or media further comprises one or more sequences of instructions which, when executed by at least one of the one or more processors, causes steps to be performed comprising:
  training the altered neural network architecture until convergence;
  determining one or more performance metrics and one or more resources usage metrics of the trained altered neural network architecture when operating under a plurality of resource constraint environments; and
  determining an immediate reward for the altered neural network architecture based upon at least some of the one or more performance metrics and the one or more resources usage metrics.

11. The neural network architect system of claim 10 wherein the non-transitory computer-readable medium or media further comprises one or more sequences of instructions which, when executed by at least one of the one or more processors, causes steps to be performed comprising:
  repeating, until a stop condition is reached, having the altered neural network architecture be the neural network architecture and generating a set of trained altered neural network architectures and their corresponding immediate rewards.

12. The neural network architect system of claim 11 wherein the non-transitory computer-readable medium or media further comprises one or more sequences of instructions which, when executed by at least one of the one or more processors, causes steps to be performed comprising:
  generating at least one additional set of trained altered neural network architectures and their corresponding immediate rewards for the policy network.

13. The neural network architect system of claim 12 wherein the non-transitory computer-readable medium or media further comprises one or more sequences of instructions which, when executed by at least one of the one or more processors, causes steps to be performed comprising:
  applying a policy gradient that uses at least some of the corresponding immediate rewards of the sets of trained altered neural network architectures to update the policy network to form an updated policy network.

14. The neural network architect system of claim 13 wherein the non-transitory computer-readable medium or media further comprises one or more sequences of instructions which, when executed by at least one of the one or more processors, causes steps to be performed comprising:
  repeating, until a stop condition is reached:
    having the updated policy network be the policy network;
    selecting a starting neural network architecture using its corresponding immediate reward;
    generating a final set of trained altered neural network architectures and their corresponding immediate rewards; and
    selecting an altered neural network architecture from the final set of trained altered neural network architectures for a use with specific resource constraints.

15. The neural network architect system of claim 9 wherein an output of the action neural network is a direction of change in a search space and the non-transitory computer-readable medium or media further comprises:

a search space comprising neural network layer type and its corresponding feature or features, module type and its corresponding feature or features, or both, which is used in conjunction with the output of the action neural network to determine specific alterations of the neural network architecture.

16. A non-transitory computer-readable medium or media comprising one or more sequences of instructions which, when executed by at least one processor, causes steps to be performed comprising:

using a policy network comprising a network embedding neural network, a scale neural network, and an action neural network:

converting a neural network architecture into a network embedding of the neural network architecture using the network embedding neural network, in which the neural network architecture comprises one or more layers, one or more network modules, or both, and each of the one or more layers or one or more modules has at least one corresponding feature;

using the scale neural network, which receives the network embedding of the neural network architecture, identifying a value for each of one or more features of the neural network architecture;

using the action neural network, which receives the network embedding of the neural network architecture, determining whether to remove a portion of the network architecture, keep a portion of the network architecture, or add a portion to the network architecture, wherein a portion of the network architecture is a layer or is one or more modules;

creating an altered neural network architecture by:
responsive to the action neural network indicating to remove a portion, removing the portion from the network architecture and adjusting one or more inputs to account for the removed portion;
responsive to the action neural network indicating to keep a portion, altering one or more features of the neural network architecture as indicated by the scale neural network; and
responsive to the action neural network indicating to insert a portion, altering the neural network architecture by inserting the portion with features, in which the portion and its features are sampled from a distribution; and outputting the altered neural network architecture.

17. The non-transitory computer-readable medium or media of claim 16 further comprises one or more sequences of instructions which, when executed by at least one processor, causes steps to be performed comprising:

training the altered neural network architecture until convergence;

determining one or more performance metrics and one or more resources usage metrics of the trained altered neural network architecture when operating under a plurality of resource constraint environments;

determining an immediate reward for the altered neural network architecture based upon at least some of the one or more performance metrics and the one or more resources usage metrics; and repeating, until a stop condition is reached, having the altered neural network architecture be the neural network architecture and generating a set of trained altered neural network architectures and their corresponding immediate rewards.

18. The non-transitory computer-readable medium or media of claim 17 wherein the non-transitory computer-readable medium or media further comprises one or more sequences of instructions which, when executed by at least one processor, causes steps to be performed comprising:

generating at least one additional set of trained altered neural network architectures and their corresponding immediate rewards for the policy network; and applying a policy gradient that uses at least some of the corresponding immediate rewards of the sets of trained altered neural network architectures to update the policy network to form an updated policy network.

19. The non-transitory computer-readable medium or media of claim 18 further comprises one or more sequences of instructions which, when executed by at least one processor, causes steps to be performed comprising:

repeating, until a stop condition is reached:
having the updated policy network be the policy network;
selecting a starting neural network architecture using its corresponding immediate reward;
generating a final set of trained altered neural network architectures and their corresponding immediate rewards; and
selecting an altered neural network architecture from the final set of trained altered neural network architectures for a use with specific resource constraints.

20. The non-transitory computer-readable medium or media of claim 16 wherein an output of the action neural network is a direction of change in a search space and the non-transitory computer-readable medium or media further comprises:

a search space comprising neural network layer type and its corresponding feature or features, module type and its corresponding feature or features, or both, which is used in conjunction with the output of the action neural network to determine specific alterations of the neural network architecture.

* * * * *